(12) United States Patent
Yan

(10) Patent No.: US 11,915,213 B2
(45) Date of Patent: Feb. 27, 2024

(54) SYSTEMS AND METHODS FOR DOMESTIC AND/OR CROSS BORDER BLOCKCHAIN TRANSACTION SOLUTIONS INVOLVING CENTRAL BANK DIGITAL CURRENCY

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

(21) Appl. No.: 17/481,098

(22) Filed: Sep. 21, 2021

(65) Prior Publication Data

US 2022/0292470 A1 Sep. 15, 2022

Related U.S. Application Data

(60) Provisional application No. 63/241,974, filed on Sep. 8, 2021, provisional application No. 63/228,584, filed on Aug. 2, 2021, provisional application No. 63/197,923, filed on Jun. 7, 2021, provisional application No. 63/161,396, filed on Mar. 15, 2021.

(51) Int. Cl.
| | |
|---|---|
| G06Q 20/06 | (2012.01) |
| G06Q 20/38 | (2012.01) |
| G06Q 20/36 | (2012.01) |
| G06Q 20/10 | (2012.01) |
| G06Q 20/40 | (2012.01) |
| G06Q 40/02 | (2023.01) |
| G06Q 20/02 | (2012.01) |
| G06Q 40/04 | (2012.01) |
| G06F 9/54 | (2006.01) |

(52) U.S. Cl.
CPC ......... *G06Q 20/0655* (2013.01); *G06Q 20/02* (2013.01); *G06Q 20/108* (2013.01); *G06Q 20/1085* (2013.01); *G06Q 20/36* (2013.01); *G06Q 20/363* (2013.01); *G06Q 20/367* (2013.01); *G06Q 20/3678* (2013.01); *G06Q 20/381* (2013.01); *G06Q 20/389* (2013.01); *G06Q 20/38215* (2013.01); *G06Q 20/401* (2013.01); *G06Q 20/405* (2013.01); *G06Q 40/02* (2013.01); *G06Q 40/04* (2013.01); *G06F 9/547* (2013.01); *G06Q 2220/00* (2013.01)

(58) Field of Classification Search
CPC ............ G06Q 20/4016; G06Q 20/065; G06Q 20/389; G06Q 2220/00; G06Q 20/0655; G06Q 20/363; G06Q 20/38215; G06F 16/9024; G06F 20/108
USPC .......................................................... 705/64
See application file for complete search history.

(56) References Cited

U.S. PATENT DOCUMENTS

| | | | |
|---|---|---|---|
| 11,601,498 | B2 * | 3/2023 | Jayaram et al. |
| 2018/0268382 | A1 * | 9/2018 | Wasserman |
| 2019/0034888 | A1 | 1/2019 | Grassadonia et al. |
| 2019/0188652 | A1 * | 6/2019 | Hunter et al. |
| 2019/0303926 | A1 * | 10/2019 | Yantis et al. |
| 2020/0120019 | A1 * | 4/2020 | Chen et al. |

(Continued)

*Primary Examiner* — Neha Patel
*Assistant Examiner* — Yin Y Choi
(74) *Attorney, Agent, or Firm* — Sheppard Mullin Richter & Hampton LLP

(57) ABSTRACT

Systems and methods are provided for processing global CBDC transactions in a blockchain supported network, where domestic and foreign banking institutions may provide mutual hosting of a consortium blockchain to allow more seamless and direct CBDC supported transactions, and CBDC exchanges in real-time or near-real time.

22 Claims, 8 Drawing Sheets

(56) References Cited

U.S. PATENT DOCUMENTS

2020/0387910 A1* 12/2020 Ponceleon et al.
2021/0233170 A1* 7/2021 Cadet
2021/0304198 A1* 9/2021 Lingappa

* cited by examiner

SYSTEMS AND METHODS FOR DOMESTIC AND/OR CROSS BORDER BLOCKCHAIN TRANSACTION SOLUTIONS INVOLVING CENTRAL BANK DIGITAL CURRENCY

CROSS-REFERENCE TO RELATED APPLICATIONS

The present application claims the benefit of U.S. Provisional Patent Application No. 63/161,396 filed on Mar. 15, 2021, U.S. Provisional Patent Application No. 63/197,923 filed on Jun. 7, 2021, U.S. Provisional Patent Application No. 63/228,584 filed on Aug. 2, 2021, and U.S. Provisional Patent Application No. 63/241,974 filed on Sep. 8, 2021, each of which is incorporated herein by reference in its entirety.

TECHNICAL FIELD

The present disclosure relates to systems and methods for providing novel central bank digital currency (CBDC) transaction solutions utilizing domestic and/or cross-border blockchain integration to achieve intelligent enhancements over conventional systems and methods. Some specific embodiments herein relate to intelligent domestic and/or cross-border (e.g., across jurisdictions), cross-format (e.g., between blockchain formats), and/or cross-network (e.g., between different banking networks) blockchain transaction processing for both account-based transactions and cash-based transactions.

BACKGROUND

The solutions of the present disclosure provide a fundamentally different and monumental alternative to the traditional transaction process. With the technology of the present disclosure, domestic and/or global CBDC transactions—with many forms of CBDC issued by a plurality of different central banks—can be processed seamlessly and efficiently (whether within a single jurisdiction, or across multiple jurisdictions), and while limiting the use of computing resources. Moreover, the flexibility that the technology of the present disclosure provides to network participants is virtually limitless, allowing domestic and/or global transactions to take place without the hassle, inconvenience, or computational burden of traditional currency exchange processes. Embodiments of the disclosure will be discussed in further detail herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Systems and methods of the present disclosure include domestic and/or cross-border blockchain architectures, processes, and strategies to enable more dynamic and versatile blockchain based transaction processing (e.g., authorization, authentication, clearing, and/or settlement, etc.). Systems and methods of the present disclosure provide novel blockchain architectures, relationship management routines, fee minimization techniques, computational resource balancing/reduction, triaged transparency schema, jurisdiction and role-based privacy regimes, bank run avoidance solutions, intelligent transaction boundary designs, and/or foreign currency exchange mechanisms.

Figure 1:
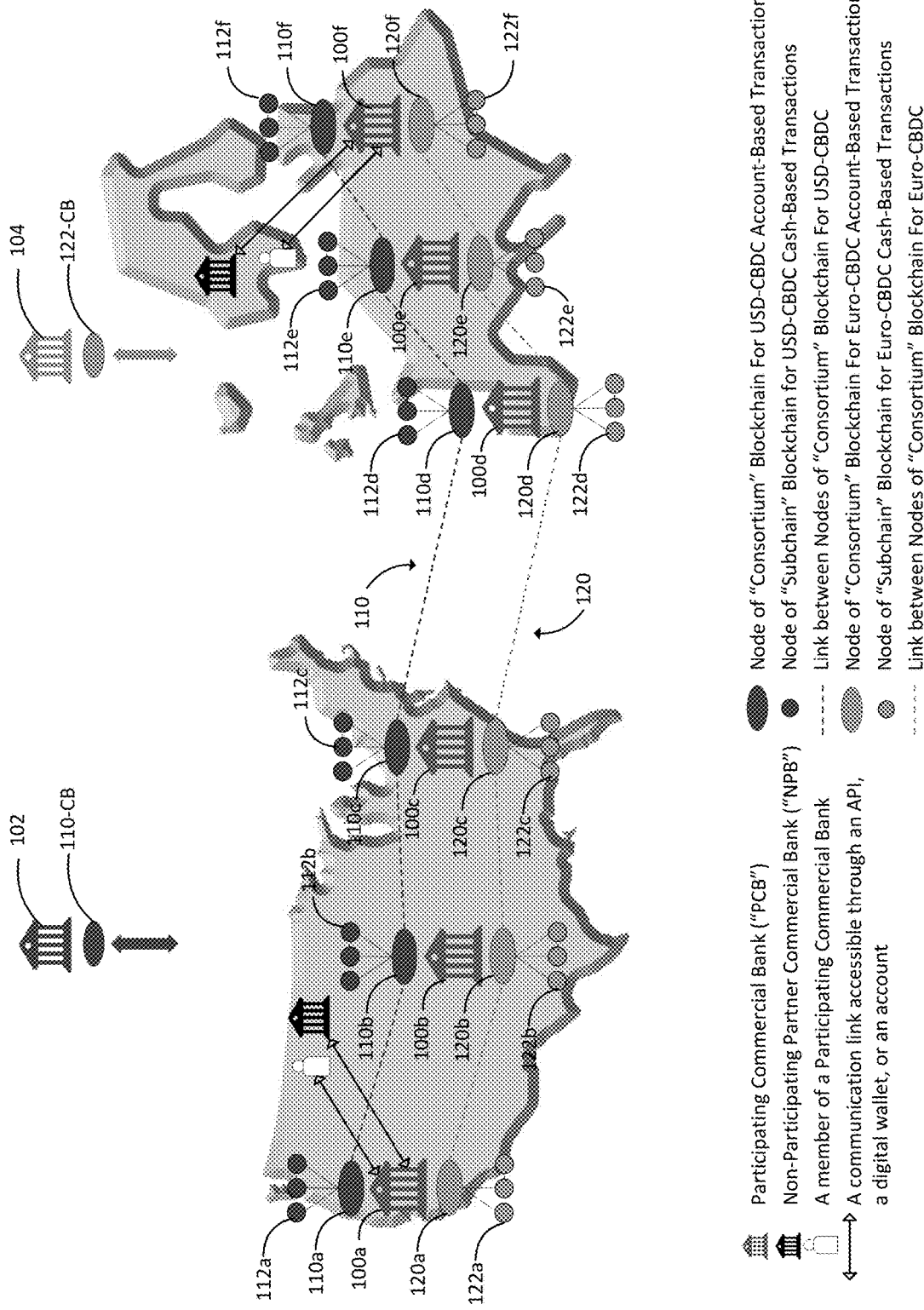
FIG. 1 illustrates an example domestic and/or cross-border blockchain transaction network in accordance with one or more embodiments of the present disclosure.

FIG. 1 illustrates an example domestic and/or cross-border blockchain transaction network in accordance with one or more embodiments of the present disclosure. The illustrated domestic and/or cross-border blockchain architecture may include one or more "consortium" blockchains (also referred to herein as "consortium chains," for short), such as consortium chain 110 and consortium chain 120. Each consortium chain in a given deployment may be dedicated to processing transactions that involve a specific type of CBDC (for example, the type of CBDC issued by a central bank of a single jurisdiction, such as USD-CBDC issued by the United States Central Bank (commonly known as the "US Fed")). For the given type of CBDC that a given consortium chain is dedicated to processing, the consortium chain may be configured to process transfers or exchanges of such CBDC between bank accounts configured to hold such CBDC (referred to herein as "account-based" transactions).

For example, as illustrated in FIG. 1, the network may include a first consortium chain 110 dedicated to processing account-based transactions involving USD-CBDC (i.e., CBDC issued by the United States Central Bank 102), and a second consortium chain 120 dedicated to processing account-based transactions involving Euro-CBDC (i.e., CBDC issued by the European Central Bank 104).

In general, a consortium chain is comprised of one or more node(s) hosted by one or more commercial banks and central banks, where any such commercial banks may be located inside (a.k.a. domestic) or outside (a.k.a., foreign) the jurisdiction that issued the CBDC that the given consortium chain is dedicated to processing. Commercial banks that host one or more nodes of any consortium chain configured within the architecture are referred to herein as "Participating Commercial Banks" (or "PCBs," for short). For instance, a consortium chain 110 for USD-CBDC may be hosted by node(s) 110a, 110b, 110c, 110d, 110e, 110f provided by one or more domestic PCBs 100a, 100b, 100c (i.e., participating PCBs located in the United States) as well as node(s) provided by one or more foreign PCBs 100d, 100e, 100f (i.e., participating PCBs located outside the United States, e.g., in Europe).

The domestic and/or cross-border blockchain architectures of the present disclosure may further include one or more "sub-chain" blockchains (also referred to herein as "subchains," for short). A given subchain is made up of one or more node(s) hosted by a single PCB. For example, as illustrated in FIG. 1, the architectures of the present disclosure may include a USD-CBDC subchain made up of one or more nodes 112a maintained by PCB 100a, and similarly for nodes 112b-f maintained by PCBs 100b-f, respectively. In similar fashion, as further illustrated in FIG. 1, the architectures of the present disclosure may include a Euro-CBDC subchain made up of one or more nodes 122a maintained by PCB 100a, and similarly for nodes 122b-f maintained by PCBs 100b-f, respectively. Each PCB's subchain is dedicated to processing transactions that involve one type (or, in some embodiments, multiple types) of CBDC being transferred between two digital wallets, or between a digital wallet and a bank account (referred to herein, individually and collectively, as "cash-based transactions"). While subchains are specifically not dedicated to processing transactions that involve direct transfers of CBDC between bank accounts (which, as noted previously, are referred to as account-based transactions), in some embodiments such subchains may be configured to process direct transfers of CBDC between bank accounts for amounts of CBDC beneath a predetermined threshold (e.g., transfers of USD-CBDC below $20 USD-CBDC, below $50 USD-CBDC, below $1,000 USD-CBDC, or below any predetermined or preset threshold amount of USD-CBDC). Though each PCB may have its own subchain(s), in some embodiments one or more of a given PCB's subchain(s) may be linked with one or more of the subchains of one or more of the other PCBs in order to facilitate "cross-chain" transactions (discussed further below).

To enable higher computational performance (e.g., faster computer network processing speed metrics) and efficiency, a single PCB may have multiple subchains dedicated to processing cash-based transactions meeting predefined criteria (e.g., a particular type of CBDC, originating from a particular geographic location, and/or any other definable criteria or combination of definable criteria). In some embodiments, a single PCB may maintain node(s) hosting multiple subchains for processing transactions involving a given type of CBDC. In some such embodiments, each subchain (among the multiple subchains for the given type of CBDC) may be dedicated to processing different categories of cash-based transactions.

For example, based in part on transaction volume, one subchain of a PCB may be dedicated to processing USD-CBDC cash-based transactions within New York City, while another subchain of the same PCB may be dedicated to processing USD-CBDC cash-based transactions within California, while yet another subchain of the same PCB may be dedicated to processing USD-CBDC cash based transactions within the remaining 48 states. In such an implementation, individual subchains of this type may be said to be "geo-specific" subchains or "region-specific" subchains.

In another example, based in part on a measure of transaction importance or client-relationship/classification priorities, one subchain of a PCB may be dedicated to processing USD-CBDC cash-based transactions involving or initiated by customers falling within a first tier (based on a predefined rule, selection, or setting), while another subchain of the same PCB may be dedicated to processing USD-CBDC cash-based transactions involving or initiated by customers falling within a second tier (based on a predefined rule, selection, or setting), while yet another subchain of the same PCB may be dedicated to processing USD-CBDC cash based transactions involving or initiated by customers falling within a third tier (based on a predefined rule, selection, or setting). In such an implementation, individual subchains of this type may be said to be "customer-specific" or "transaction-specific" subchains. Many other examples of subchain specificity (beyond "geo-specific" and "customer-specific") may be implemented for processing speed enhancements, load balancing, fail-safe policies, power saving efforts, or other efforts to enhance computational performance and/or transaction speed efficiencies—depending on what criteria are best suited to the particular application, priorities, or environment within which the disclosed technology is deployed.

In addition to provisioning multiple subchains for different categories of cash-based transactions involving a given type of CBDC, a PCB server-side configuration may be designed to offload—under predefined circumstances—one or more account-based transactions onto the PCB's legacy transaction processing system. The network described herein may be configured to execute such an offloading (e.g., via an application server or other computing engine) when transaction volume on a given consortium blockchain exceeds a predefined threshold. For example, the network may be configured to begin offloading subsequently-initiated transactions to the PCB's legacy system whenever the current computing resources dedicated to a given consortium chain exceeds 80% capacity, and then return to normal operation (processing all qualifying account-based transactions on the given consortium blockchain) when capacity falls back down below 80%, for instance. Additionally, it should be noted that capacity measurements may be dynamic (i.e., change with time or circumstance). In some instances the capacity measure of a consortium blockchain server node may be observably driven to zero capacity if the server experiences a failure. In such cases, the network would be configured to push all transactions that would otherwise be processed by the consortium chain server node to the legacy transaction system servers of the PCB (which may later be synchronized with the consortium chain once the consortium chain server node comes back online or otherwise regains acceptably operable status). In this way, the network may be configured to have one or more multi-layer failsafe mechanisms to enhance processing times and provide a highly reliable transaction processing environment.

By hosting node(s) of the consortium chain as well as node(s) of a "sub-chain," PCBs serve as a link to support account-based transactions and cash-based transactions, and for multi-step transactions that may involve both cash-based and account-based transactions. PCBs may be configured with the intelligence to selectively process transactions (or portions of transactions) on different blockchains with flexibility and agility, which in some embodiments may be based on the nature of the overall transaction, the nature of one or more steps in the transaction (e.g., the nature of the first leg or second leg of a given multi-step transaction which together achieve the overall transaction), the location of the accounts of the parties to the transaction (and/or the parties to the first or second leg of the transaction), the types of fiat and/or CBDC currency involved in the transaction (and/or the types involved in the first or second leg of the transaction).

A consortium blockchain may further comprise one or more node(s) hosted by a central bank (e.g., United States Central Bank 102, Euro Central Bank 104). A central bank for a given jurisdiction supervises or exercises control over PCBs in the given jurisdiction, and govern the creation (sometimes referred to as "minting"), issuance (sometimes referred to as "putting into circulation), restriction (sometimes referred to as "locking"), and removal (sometimes referred to as "burning" or "removing from circulation") of the jurisdiction-specific CBDC that serves as legal tender in that jurisdiction. The central bank designed for handling jurisdiction-specific CBDC for the jurisdiction may be the same central bank designed for handling jurisdiction-specific fiat currency for the jurisdiction. For instance, in Europe, the central bank may be operated by the European Union Central Bank and may mint, put into circulation, lock, remove from circulation, Euro CBDC (central bank digital currency).

As noted above, a consortium blockchain may be configured to process "account-based" transactions for a given type of CBDC, including transactions that involve or otherwise require movements of CBDC currency between two or more CBDC accounts at different PCBs (e.g., where the payer and payee hold CBDC accounts at two different participating banking institutions). Also as noted above, a subchain blockchain (sometimes referred to as a cash chain) is configured to process "cash-based" transactions (and/or account-based transactions in amounts not exceeding a predefined threshold, e.g., not exceeding $50 USD-CBDC, not exceeding $100 USD-CBDC, or other predefined threshold). Cash-based transactions include those transactions that involve or otherwise require movements of CBDC (1) between two or more digital wallets (e.g., sending and receiving CBDC where the payer and payee are both wallet holders at one or more PCBs (which may be the same PCB or different PCBs) or a nonparticipating commercial bank that has partnered with one or more PCBs for purposes of transacting on the network (referred to herein as "nonparticipating partner commercial bank" or "NPB" for short), and are using those wallets for the transaction, or (2) between a digital wallet and an account, where the account may be an account held by (a) a PCB itself (e.g., a customer (payer) making a deposit or a withdrawal at their PCB (as payee), or a customer (as payer) exchanging fiat currency for CBDC currency with their PCB (as payee), vice versa), (b) another member of any PCB (which may include a person or entity that is a different person or entity than the holder of the digital wallet, or even a different PCB or NPB within the network that is a member of the PCB), or (c) another member of another PCB (or NPB) that is different from the PCB providing the digital wallet to the holder of the digital wallet involved in the transaction.

As noted, in a desirable deployment, each type of CBDC may have its own consortium blockchain. PCBs in one jurisdiction (which may be referred to as domestic participating banks, depending on the context) may partner with PCBs in other jurisdictions (which may be referred to as foreign participating banks) to form a consortium, which together host one or more consortium blockchains (each dedicated to a different type of CBDC) to support the domestic and/or cross-border blockchain transaction network. In such embodiments, PCBs across multiple jurisdictions may have one or more nodes dedicated specifically to each type of CBDC introduced into the domestic and/or cross-border blockchain transaction network. PCBs may maintain physically separate servers as the consortium blockchain node(s) for respective types of CBDC. Alternatively, PCBs may maintain virtually separate servers as the consortium blockchain node(s) for respective types of CBDC (i.e., the nodes may be virtually/logically separate but still be hosted on the same physical server). In implementations adopting such architectures, PCBs may serve as a bridge (sometimes referred to herein as a "link," "coupling point," or "cross") between the various CBDC-specific consortium blockchains within the network. As discussed herein, the bridge provided by such PCBs may be configured to achieve more efficient streamlined foreign currency exchange procedures.

Such architectures may be implemented even though a given central bank may only issue the type of CBDC it mints to PCBs that maintain situs in the jurisdiction over which the central bank exercises control. It should be understood, however, that it is within the scope of the present disclosure to implement the same or similar architecture where, perhaps in the future, central banks begin to issue CBDC to PCBs having a situs outside the jurisdiction over which the given central bank exercises control (or at least allow such foreign PCBs to exchange or purchase such CBDC with/from the central bank).

Further still, the architecture illustrated in FIG. 1 may be further extended to NPBs (or even to a payment service or other third party service in operative communication with banking institutions) that do not host any portion of the consortium blockchain. Thereby, NPB may provide their own customers with one or more benefits of the disclosed network by submitting transactions for processing thereon through one of the PCBs with whom they partner. For example, as shown in FIG. 1, a NPB may establish a relationship with one or more PCBs to enable the NPB to initiate transactions on behalf of its customers, and permit the PCB to process the transaction on the appropriate blockchain on behalf of such NPB. For example, an NPBs may partner with a domestic or foreign PCB, and initiate the execution of a transaction via an API, a digital wallet or an account that the domestic or foreign PCB makes available to the NPB. In some implementations, NPBs in a given jurisdiction can set up one or more accounts with one of the PCBs in the same or different jurisdiction (or in the country that mints and issues the CBDC the NPB is interested in transacting in) and relay its customers' (or its own) transactions through the PCB with whom it has set up an account. Based on the details of the transaction, the PCB with whom the NPB has partnered may process the transaction through the consortium chain, through its "subchain" blockchain, or its legacy transaction network (for which it may thereafter sync one or more transaction details into the consortium blockchain and/or its own "subchain" blockchain). Business incentives may be established between PCBs and NPBs such that PCBs realize a benefit (e.g., collect a fee) from processing transactions on the consortium blockchain or subchain on behalf of NPBs (or customers of NPBs).

The architecture in FIG. 1 supports both "account based" transactions and "cash-based" transactions involving an "account" and/or a hosted "digital wallet" (which may be linked to an account). PCBs may be configured to host for its customers (e.g., users, NPBs, merchants, etc.) digital wallets corresponding to one or more types of CBDC (and related accounts). PCBs may offer its customers (e.g., users, NPBs, merchants, etc.) a companion digital wallet application on their computing device (e.g., a smartphone application, web application, etc.) to permit such customers to control their corresponding accounts and initiate or otherwise participate in cash-based and/or account-based transactions on the domestic and/or cross-border transaction network (with application calls being made to the PCB application servers through an API, for example). In some embodiments, a PCB may host multiple digital wallets for a customer, where each digital wallet is linked to one or more accounts (and related blockchain) corresponding to a single type of CBDC. In some embodiments, a PCB may host a single digital wallet for a customer, where the digital wallet is linked to accounts (and related blockchains) corresponding to multiple types of CBDC. In some embodiments, a customer's own digital wallet may be configured to manage and/or host multiple different types of CBDC and/or the same type of CBDC received from different PCBs. Though in some embodiments, a given digital wallet may only link to accounts at one bank, in other embodiments a given digital wallet can be linked to accounts at multiple participating and/or non-PCBs (and can deposit/withdraw from those multiple bank accounts through calls through such respective banks' APIs). In some implementations, particularly those implementations where a single digital wallet links to accounts at only one bank, a given user may have access to multiple discrete digital wallets that are coupled with the accounts the user holds with the respective PCBs. Customers of PCBs that host customers' digital wallets can utilize their companion digital wallet applications to deposit and/or withdraw CBDC by syncing their digital wallets with the PCBs wallets (or via the bank ATM or bank teller) to reflect currency movements/exchanges made with the customers' bank accounts. In some embodiments, such PCBs or central banks can set upper amount limits, frequency of transactions per period limits, or otherwise invalidate, restrict or block for withdrawals and/or deposits of CBDC.

Moreover, because PCBs maintain nodes of the consortium blockchain, in the event a user loses the device hosting their digital wallet, the PCB may with certainty restore the user's digital wallet (including all balances and transaction history associated therewith) onto a new device (subject to authentication, verification, validation requirements, etc. imposed by the PCB and/or consortium). Similarly, PCBs may be configured with the ability to lock a digital wallet (based on predefined criteria) or otherwise restrict the ability of the digital wallet to engage in transactions on the network. Similarly, customers may sync their digital wallets with the PCBs' ATM or bank wallet or bank teller to convert or exchange an amount of CBDC currency into/for (a) physical fiat cash corresponding to or issued in the same jurisdiction as the type of CBDC being converted/exchanged (e.g., converting USD-CBDC into USD-fiat cash), (b) electronic fiat currency (i.e., an electronic representation of fiat cash, which may be represented in an electronically viewable account held by a PCB) corresponding to the type of CBDC being converted/exchanged (e.g., converting USD-CBDC into an electronic representation of USD-fiat), (c) a type of CBDC that is of a different type or issued from a different jurisdiction than at least some of the CBDC being converted/exchanged (e.g., converting USD-CBDC into Euro-CBDC), (d) a type of fiat currency that is of a different type or issued from a different jurisdiction than at least some of the CBDC being converted/exchanged (e.g., converting USD-CBDC into Euro-fiat), (e) a type of private cryptocurrency not issued by any central bank (e.g., such as exchanging USD-CBDC into an amount of another cryptocurrency such as Bitcoin, Ethereum, etc.), or (f) any combination of the foregoing. In some embodiments, the reverse may also be achievable. That is, customers may present physical fiat cash to the PCB through a PCB's ATM or bank teller to convert or exchange physical fiat cash (or may sync their digital wallets with the PCBs' ATM or bank wallet or bank teller to convert or exchange an amount of electronic fiat cash) into/for (a) CBDC corresponding to or issued in the same jurisdiction as the type of physical or electronic fiat being converted/exchanged (e.g., converting USD-fiat cash into USD-CBDC), (b) electronic fiat currency (if what is being presented by the customer for conversion is physical fiat) or physical fiat currency (if what is being presented by the customer for conversion is electronic fiat) corresponding to the type of currency being converted/exchanged (e.g., converting physical USD-fiat into an electronic representation of USD-fiat, or vice versa), (c) a type of CBDC that is of a different type or issued from a different jurisdiction than at least some of the fiat being converted/exchanged (e.g., converting USD-fiat into Euro-CBDC), (d) a type of fiat currency that is of a different type or issued from a different jurisdiction than at least some of the fiat currency being converted/exchanged (e.g., converting USD-fiat into Euro-fiat), (e) a type of cryptocurrency not issued by any central bank (e.g., such as exchanging USD-fiat into an amount of a cryptocurrency such as Bitcoin, Ethereum, etc.), or (f) any combination of the foregoing.

In some embodiments, PCBs can set upper amount limits, set frequency of transactions per period limits, or otherwise invalidate, restrict or block any of the aforementioned conversions/exchanges (e.g., block or restrict CBDC-to-fiat conversions/exchanges, fiat-to-CBDC conversions/exchanges, CBDC-to-CBDC conversions/exchanges, CBDC-to-other cryptocurrency conversions/exchanges, and other cryptocurrency-to-CBDC conversions/exchanges, etc.). Participating PCBs and/or central banks may establish or otherwise define "alert" conditions such that transactions requests satisfying certain criteria will trigger an alert to be sent to a designated entity. For example, a central bank may establish an "alert" condition that triggers an alert to be transmitted to central bank when an account-based transaction exceeds a particular amount of CBDC or fiat currency equivalent. Similarly, a PCB may establish an "alert" condition that triggers an alert to be transmitted to a PCB security authority when a cash-based transaction exceeds a particular amount of CBDC or fiat currency equivalent.

In some embodiments, digital wallets of the present disclosure may implement or otherwise embody all of the technologies disclosed in connection with digital wallets described in U.S. application Ser. Nos. 16/920,340, 16/920,372, and 16/920,388 (including but not limited to payee initiated transfers, payer initiated transfers, node functionality, operative coupling with payee banking institutions for direct transfers, digital wallet locking, digital wallet restoration, digital wallet based transactions via TOT technology (with later account syncing), offline transactability (with later account syncing), debit card linking, credit card linking, multi-card linking, biometric authentication, prioritized account selection and processing), and may submit any and all such transactions for processing on a consortium blockchain or subchain blockchain of the present disclosure as may be desirable in accordance herewith.

In some embodiments a digital wallet of the present disclosure may include a network participant's CBDC token holdings (which may, in some instances, have been sourced from CBDC based loans, CBDC based credit cards, CBDC based debit cards, any and all of which may be linked to the digital wallet (or multiple digital wallets) of the present disclosure). Digital wallets of the present disclosure may be further configured to provide management functionality, alone or in coordination with other resources within the domestic and/or cross-border blockchain transaction networks of the present disclosure, such as transferring, converting, sending (e.g., in response to a payee initiated transaction), receiving (e.g., in response to a payer initiated transaction), releasing, exchanging, depositing, withdrawing, moving, securing or otherwise operating on CBDC, private cryptocurrency funds and/or fiat funds upon request. For example, a digital wallet may be configured to transfer CBDC into a digital wallet of another participant's as part of a transaction, and/or receive tokens from another participant's digital wallet as part of a transaction, and/or redeem CBDC for fiat currency with appropriate consortium or subchain nodes, and/or receive tokens from appropriate consortium or subchain nodes in exchange for fiat currency and/or as part of a CBDC based credit line (which may, in some embodiments, be connected to a token based loan, as described in U.S. application Ser. No. 16/820,661, which is incorporated by reference herein in its entirety). A digital wallet of the present disclosure may also be configured to effectuate a release or transfer of CBDC into another digital wallet, effectuate an exchange of CBDC for fiat cash, effectuate an exchange of fiat cash for CBDC, effectuate an exchange of one CBDC for another CBDC, effectuate a deposit of CBDC, effectuate a withdrawal of CBDC, and so on in connection with one or more digital wallets and/or the accounts linked thereto (e.g., deposit accounts, credit accounts, check accounts, etc.).

In some embodiments, a digital wallet may comprise a mobile (e.g., iOS or Android based) or desktop (e.g., PC or Mac based) app that stores one or more CBDCs. A given digital wallet may (i) be linked to accounts held at different issuing banks (ii) comprise or have access to one or more CBDCs of any type (USD-CBDCs, Euro-CBDCs, etc.). A digital wallet of the present disclosure may store the various CBDCs it receives from other accounts or digital wallets and may be utilized to pay or otherwise transfer CBDC to other network participants (including other banks such as PCBs or NPBs). A digital wallet of the present disclosure may be configured to operate a digital wallet application configured to store, pay and/or receive different CBDCs issued by various central banks, and further to store a user identification object (e.g., a photo, a name, an avatar, a thumbnail, or other user ID object associated with the owner of the digital wallet), a wallet address (sometimes referred to herein as a Wallet ID). The digital wallet application may further be configured intelligently select the payment method (e.g., select among a plurality of optional CBDCs and/or fiats, or credit lines of such currencies) for a given transaction. A digital wallet can further be configured to receive receipts, enter data, provide confirmations (e.g., signatures), scan or sync codes, and/or receive feedbacks as to whether or not a payment for a proposed transaction was successful or failed.

A digital wallet of the present disclosure may be configured to authenticate a user using stored or otherwise accessible authentication information (e.g., biometric information, PIN numbers, Wallet ID). Moreover, a digital wallet of the present disclosure may be configured to confirm a transaction using stored or otherwise accessible authentication information (e.g., biometric information, PIN numbers, Wallet ID). A digital wallet of the present disclosure may be configured to scan, read, receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the consortium and/or subchain blockchain(s) such that authentication initiated by the relevant digital wallet may be performed by and/or based on the information stored in the relevant blockchain, and/or (ii) locally within such that authentication initiated by digital wallet component may be performed by and/or based on the information stored in computing device registered with and/or connected to the network (e.g., the mobile device that the digital wallet is downloaded onto).

In some embodiments, a digital wallet of the present disclosure may be configured to include or be operatively coupled with Bluetooth® or other TOT communication capabilities to enable transacting with, syncing with, or otherwise reading information from other digital wallets.

Furthermore, a digital wallet of the present disclosure may be configured to execute code to lock CBDC tokens, or allow an associated PCB or central bank to lock tokens, in an amount sufficient to support a proposed transaction, etc. In some embodiments, a digital wallet of the present disclosure may be further configured to execute code that causes the system to refund, release, receive, transfer, lock, and/or send an amount of CBDC tokens to another network participant's digital wallet. In some embodiments, a digital wallet may further be configured to execute code to provide balance reporting after one or more transactions has occurred involving tokens (e.g., CBDCs or other cryptocurrencies) managed by the digital wallet component, which may be accessible or viewable via a user device or other device within the domestic and/or cross-border blockchain transaction networks of the present disclosure. In some embodiments, a digital wallet component may further be configured to facilitate back-up (e.g., periodic back-up, on demand back-up, or one-time back-up) for later restoration by the associated network participant as needed (e.g., if the given network loses their smartphone hosting the digital wallet app).

As referred to above, and also as shown in FIG. 1, each PCB 100a-100f may maintain their own subchain(s). Subchain(s) may be hosted by a single PCB but may be communicatively coupled with the subchains of other PCBs and configured to process (1) transactions between digital wallets within the same PCB, (2) transactions between digital wallets within two partnering PCBs in the same consortium, and (3) transactions between a digital wallet of a customers of a PCB and the digital wallet or account of the PCB (e.g., deposits, withdrawals, exchanges, etc.). Digital wallets coupled with different subchains may be configured to transact with each other via a cross-subchain transaction that occurs over the subchain network, while settlement between the associated PCBs may occur (simultaneously or at a later time) through consortium chain.

With regard to transactions between customers of PCB and the PCB itself (e.g., deposits, withdrawals, exchanges, etc.) using a digital wallet. The subchain blockchain hosted by the PCB may be configured to execute transactions in any amount, even fractional amounts (amounts less than the smallest unit of the CBDC, e.g., a portion of a token). Additionally, PCBs may process transactions between internal accounts via the subchain blockchain (the same subchain blockchain that is used for digital wallet cash-based transactions initiated by its customers). Significantly, non-PCBs or NPB may partner with a PCB (e.g., through an account, digital wallet, or API connection with the partner PCB), and initiating a request for the PCB to process the transaction on the subchain blockchain on its behalf. Additional detail and illustrations of such digital wallet based transactions are provided in greater detail with reference to FIGS. 4A-4C.

Additionally, as reflected in FIG. 1, the subchain blockchain of the participating commercial blockchain may couple with the consortium blockchain, and may, as may be desired, process intrabank digital wallet transactions. The network may be configured to permit such intrabank digital wallet transactions for the same or different customers (e.g., users, merchants, NPBs, etc.) that are members of the same or different PCBs (or partnering NPBs). This involves a transfer CBDC between digital wallets hosted on respective subchains, followed by settlement of funds across the corresponding accounts via the consortium chain. For instance, where a PCB hosts nodes for multiple different types of CBDC, the PCB may run multiple CBDC transactions on the same subchain blockchain by coupling (or internally transitioning) such transactions to the nodes for respective consortium chains for the different types of currencies CBDCs involved. Alternatively, a PCB may host discrete subchain blockchain(s) for different types of CBDC. In such cases, where a PCB hosts nodes for multiple different types of CBDC, the PCB may run differing currency transactions on the different respective subchain blockchain(s) by coupling the subchain blockchain(s) for respective transactions with the nodes for the respective consortium blockchains corresponding to the different types of CBDC currencies being transacted in. A PCB may maintain multiple subchain blockchains comprising a set of subchain blockchains that correspond to a single type of CBDC. A set of subchain blockchains may be utilized in concert, for example, to enhance processing speeds and reliability through load balancing and/or distributed processing arrangements (e.g., by applying geo-specific/region-specific subchain architectures and processing regimes (discussed above), customer-specific/transaction-specific subchain architectures and processing regimes (discussed above), and the like). Similarly, a PCB may maintain a single subchain blockchain that corresponds to multiple types of CBDC. In short, the same PCB can maintain one or more subchains dedicated to processing transactions involving the same type of CBDC and/or one or more subchains dedicated to processing transactions involving different types of CBDCs.

As noted previously, in some embodiments a customer's digital wallet may link with one PCB. In such implementations, transactions involving digital wallets linked to different PCBs can be processed with cross-chain settlements. A cross chain transaction and settlement between a payer and payee participating in the network may involve a number of steps, including (1) the payer's PCB's subchain blockchain validates the payer and the payer's balance, (2) the payer signs and sends a command to cause the payer's PCB's subchain blockchain to transfer a designated amount of CBDC from the payer's digital wallet to the payee's digital wallet, (3) the payer's PCB's subchain blockchain debits the payers digital wallet and/or account balance, (4) the payee's PCB's subchain blockchain credits the payee's CBDC balance in the payee's digital wallet and/or account, and (5) the payer's PCB then settles the transaction by sending the designated amount of CBDC over consortium chain periodically (at any predefined interval or time period).

Referring still to FIG. 1, with enhanced transaction capabilities comes enhanced need for tailored visibility, transparency, and privacy within the domestic or cross-border blockchain transaction networks of the present disclosure. Smart contracts may be utilized to execute and/or otherwise govern the execution of transactions submitted for processing on the domestic or cross-border blockchain transaction networks of the present disclosure. Central banks may query the smart contracts used in or for a transaction or series of transactions.

In some embodiments, each jurisdiction (e.g., each country) may have its own smart contract, and may mandate that transactions located within the jurisdiction, involving participants located within the jurisdiction, and/or involving CBDC issued within the jurisdiction be executed, in whole or in part, in accordance with the smart contract. Such smart contracts may be defined to give the central bank exercising control over currencies within the given jurisdiction to have visibility into the transactions involving the jurisdiction's smart contract (i.e., transactions meeting the criteria which, when met, impose the requirement for the smart contract to be used in the execution of the transaction on the network). In some implementations, each jurisdiction have imposed an obligation on PCBs to process transactions pursuant to one or more smart contracts that limit or enable certain visibility permissions. For example, smart contracts may be leveraged to control visibility into various transactions taking place in the domestic and/or cross-border blockchain transaction networks of the present disclosure, including based on various criteria, any and all rules and criteria that may be desirable for a given deployment may be utilized. That is, smart contracts may be used in various capacities within the network, and in many instances may govern the visibility of a given transaction to certain entities/parties. For example, and without limiting the foregoing, in some embodiments network transactions that utilize a particular type of CBDC may be required to be executed pursuant to a smart contract that permits or prohibits any one or more of (or any combination of) the following to have visibility into the transaction: (1) the central bank that minted or issued the CBDC involved in the transaction, (2) central banks that did not mint or issue the CBDC involved in the transaction, (3) the central bank that minted or issued the fiat-currency used to purchase the CBDC involved in the transaction, (4) central banks that did not mint or issue the fiat-currency used to purchase the CBDC involved in the transaction, (5) the central bank governing the jurisdiction where the payee's account is held, (6) central banks that do not govern the jurisdiction where the payee's account is held, (7) the central bank governing the jurisdiction where the payer's account is held, (8) central banks that do not govern the jurisdiction where the payer's account is held, (9) the PCBs in the same jurisdiction as the central bank that minted the CBDC involved in the transaction, (10) the PCBs that are not in the same jurisdiction as the central bank that minted the CBDC involved in the transaction, (11) the PCBs in the same jurisdiction as the central bank that minted the fiat-currency used to purchase the CBDC involved in the transaction, (12) the PCBs that are not in the same jurisdiction as the central bank that minted the fiat-currency used to purchase the CBDC involved in the transaction, (13) the PCBs in the same jurisdiction as the central bank governing the jurisdiction where the payee's account is held, (14) the PCBs that are not in the same jurisdiction as the central bank governing the jurisdiction where the payee's account is held, (15) the PCBs in the same jurisdiction as the central bank governing the jurisdiction where the payer's account is held, (16) the PCBs that are not in the same jurisdiction as the central bank governing the jurisdiction where the payer's account is held, (17) NPBs in the same jurisdiction as the central bank that minted the CBDC involved in the transaction, (18) NPBs that are not in the same jurisdiction as the central bank that minted the CBDC involved in the transaction, (19) NPBs that have partnered with a PCB in the same jurisdiction as the central bank that minted the fiat-currency used to purchase the CBDC involved in the transaction, (20) NPBs that have partnered with a PCB that is not in the same jurisdiction as the central bank that minted the fiat-currency used to purchase the CBDC involved in the transaction, (21) NPBs that have partnered with a PCB in the same jurisdiction as the central bank governing the jurisdiction where the payee's account is held, (22) NPBs that have partnered with a PCB that is not in the same jurisdiction as the central bank governing the jurisdiction where the payee's account is held, (23) NPBs in the same jurisdiction as the central bank governing the jurisdiction where the payer's account is held, (24) NPBs that have partnered with a PCB that is not in the same jurisdiction as the central bank governing the jurisdiction where the payer's account is held, (25) the PCB associated with the payee's account, (26) PCBs that are not associated with the payee's account used in the transaction, (27) the PCB associated with the payer's account, (28) PCBs that are not associated with the payer's account used in the transaction, (29) the payee, (30) the payer, (31) the central bank whose fiat currency backs the CBDC used in the transaction, (32) the central banks whose fiat currency was not used to back the CBDC used in the transaction.

For example, a transaction between central bank and a given PCB may utilize a smart contract that may limit visibility into the transaction to the central bank and the given PCB, but may block, prohibit, or restrict visibility of other PCBs and/or other central banks. In another example, a transaction between a first PCB and a second PCB may utilize a smart contract that may limit visibility into the transaction to the first and second PCBs and the central bank that minted the CBDC used in the transaction, but may block, prohibit, or restrict visibility of other PCBs and/or other central banks. In another example, a transaction between a first PCB and a second PCB may utilize a smart contract that may limit visibility into the transaction to the first PCB and/or second PCB and the central banks that exercise control over the respective jurisdictions within which one of the accounts held by the first and second PCBs are located, but may block, prohibit, or restrict visibility of other PCBs and/or other central banks.

Figure 2A:
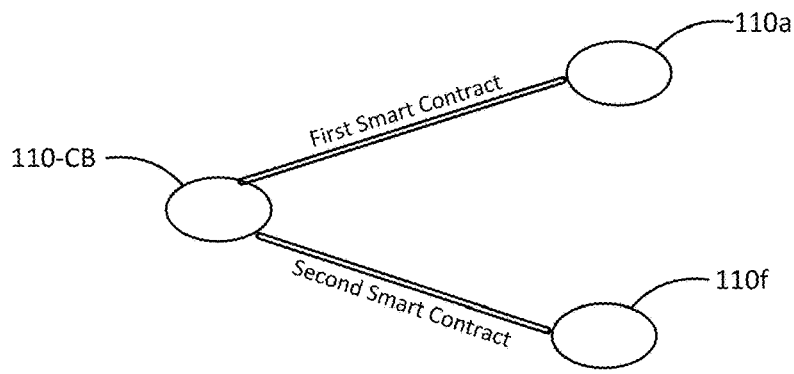
FIG. 2A illustrates a symbolic representation of an example configuration for smart contract governed transactions between two participating commercial banks—one in a first jurisdiction and one in a second jurisdiction—over a consortium blockchain that utilizes a central bank node in the first jurisdiction to bridge the sub-transactions that achieve the objective transaction, in accordance with one or more embodiments of the present disclosure.
Figure 2B:
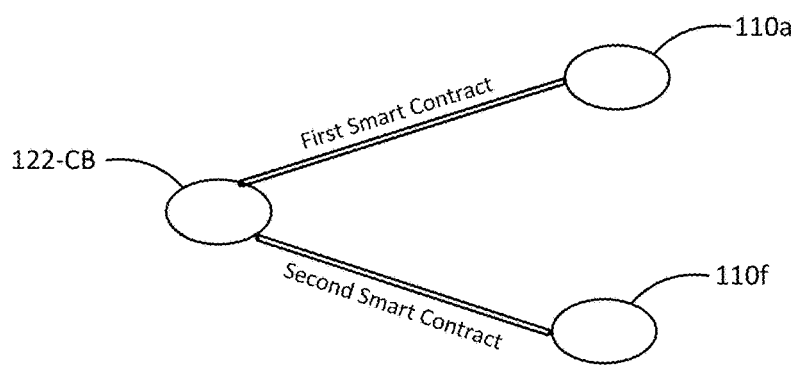
FIG. 2B illustrates a symbolic representation of an example configuration for smart contract governed transactions between two participating commercial banks—one in a first jurisdiction and one in a second jurisdiction—over a consortium blockchain that utilizes a central bank node in the second jurisdiction to bridge the sub-transactions that achieve the objective transaction, in accordance with one or more embodiments of the present disclosure.
Figure 2C:
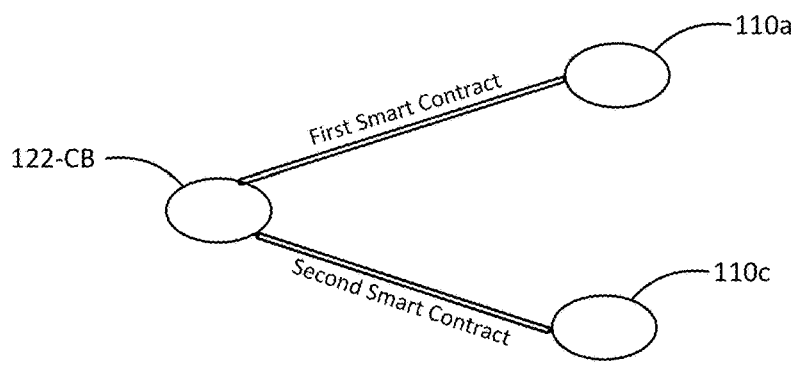
FIG. 2C illustrates a symbolic representation of an example configuration for smart contract governed transactions between a domestic participating commercial bank and a foreign participating commercial bank over a consortium blockchain, utilizing a central bank to bridge the sub-transactions that achieve the objective transaction, in accordance with one or more embodiments of the present disclosure.

Smart contracts may also be used to facilitate intra-border transactions and/or bridge cross-border transactions, examples of which are illustrated in FIGS. 2A-2C. Reference numerals in FIGS. 2A-2C correspond to the same reference numerals presented in connection with FIG. 1.

FIG. 2A illustrates the nodes of an example CBDC consortium chain (e.g., a US-CBDC consortium chain) involved in an example cross-border transaction—one node 110a (or one set of nodes 110a) hosted by a server of a first PCB in a first jurisdiction (e.g. PCB 100a located in the United States), one node 110f (or one set of nodes 110f) hosted by a server of a second PCB in a second jurisdiction (e.g. PCB 100f located in the Europe), one node 110-CB (or one set of nodes 110-CB) hosted by server of a the United States Central Bank 102 (which is in the same jurisdiction as PCB 100a but not of PCB 100f). In the illustrated example, suppose a customer of PCB 100a wishes to transact with a customer of PCB 100f, for example. In such a scenario, a first smart contract may be utilized between node(s) 110a of PCB 100a (in the first jurisdiction) and node(s) 110a-CB of the central bank 102 (also in the first jurisdiction), followed by a second smart contract between node(s) 110-CB of the central bank 102 (in the first jurisdiction) and node(s) 110f of PCB 100f (in the second jurisdiction).

FIG. 2B illustrates the nodes of an example CBDC consortium chain (e.g., a US-CBDC consortium chain) involved in another example cross-border transaction—one node 110a (or one set of nodes 110a) hosted by a server of a first PCB in a first jurisdiction (e.g. PCB 100a located in the United States), one node 110f (or one set of nodes 110f) hosted by a server of a second PCB in a second jurisdiction (e.g. PCB 100f located in Europe), one node 122-CB (or one set of nodes 110-CB) hosted by server of the European Central Bank 104 (which is in a different jurisdiction than PCB 100a but in the same jurisdiction as PCB 100f). In the illustrated example, suppose a customer of PCB 100a wishes to transact with a customer of PCB 100f, for example. In such a scenario, a first smart contract may be utilized between node(s) 110a of PCB 100a (in the first jurisdiction) and node(s) 122-CB of the central bank 104 (in the second jurisdiction), followed by a second smart contract between node(s) 122-CB of the central bank 104 (in the second jurisdiction) and node(s) 110f of PCB 100f (in the second jurisdiction).

FIG. 2C illustrates the nodes of an example CBDC consortium chain (e.g., a US-CBDC consortium chain) involved in another example cross-border transaction—one node 110a (or one set of nodes 110a) hosted by a server of a first PCB in a first jurisdiction (e.g. PCB 100a located in the United States), one node 110c (or one set of nodes 110c) hosted by a server of a second PCB in the first jurisdiction (e.g. PCB 100c located in the United States), one node 122-CB (or one set of nodes 110-CB) hosted by server of the European Central Bank 104 (which is in a different jurisdiction than both PCB 100*a* and PCB 100*c*). In the illustrated example, suppose a customer of PCB 100*a* wishes to transact with a customer of PCB 100*c* using CBDC issued by European Central Bank 104 in the second jurisdiction, for example. In such a scenario, a first smart contract may be utilized between node(s) 110*a* of PCB 100*a* (in the first jurisdiction) and node(s) 122-CB of the central bank 104 (in the second jurisdiction), followed by a second smart contract between node(s) 122-CB of the central bank 104 (in the second jurisdiction) and node(s) 110*c* of PCB 100*c* (in the first jurisdiction).

By utilizing smart contracts, including as in the examples referenced in FIGS. 2A-2C, various levels of visibility and transparency may be achievable for a range of purposes. For instance, a central bank may be enabled to monitor the type of CBDC it has minted and/or issued for account-based transactions in domestic and foreign jurisdictions, including transactions with foreign participating PCBs and NPB s and/or foreign central banks. Similarly, foreign central bank may be enabled to monitor account-based transactions of foreign CBDC between accounts within its own jurisdiction, and/or between accounts within its own jurisdiction and accounts in other jurisdictions. For instance, utilizing the domestic and/or cross-border blockchain transaction networks of the present disclosure, the U.S. Central Bank may monitor USD-CBDC transactions that occur between accounts (or involve at least one account) within the U.S. (and, in some embodiments, throughout one or more other countries and/or the entire world). Similarly, by way of another instance, the E.U. Central Bank may monitor USD-CBDC transactions that occur between accounts (or involve at least one account) within the E.U. (and, in some embodiments, any transactions with the E.U.).

By governing visibility of different players in the domestic and/or cross-border blockchain transaction networks of the present disclosure, a central bank that has minted/issued a particular type of CBDC may monitor circulation of that CBDC, and may implement controls and alerts that prevent undesirable situations (e.g., a bank run). For instance, a central bank may limit the amount of CBDC it will issue to, exchange with, or receive from any given PCB (or group of PCBs) on a per day basis, per month basis, per transaction basis, on an account specific basis, or other criteria. In another example, a central bank may limit the amount of CBDC it will permit to be transferred in a single transaction, in a single day, from a single account, or other criteria, on a per day basis, per month basis, per transaction basis, or otherwise. In another example, a central bank may block certain transactions between certain PCBs and/or between certain bank accounts/wallets.

Transaction privacy may be implemented by setting up one or more specific smart contracts between the PCBs relevant to a given transaction (which may be on top of, or an alternative to, the smart contract imposed by the relevant central bank) such that third parties (e.g., another PCB) cannot see one or more transaction details.

It should be understood that smart contracts may be used more granularly than to merely block one or more network participants from seeing the full transaction. For example, in some instances a smart contract may impose a progressive restriction regime or an otherwise tailored visibility regime. For instance, the smart contract may be configured to make certain transaction details visible to some PCBs but not others, or may make progressively fewer details visible to all other PCBs as more time passes (e.g., all information visible for 0-24 hours after the transaction settles, recipient and sender information (but no amount information) visible for 24-48 hours after the transaction settles, and no information visible thereafter). It should be appreciated, however, that in the embodiments reference above where each jurisdiction (e.g., each country) has its own smart contract, the smart contracts may be configured to permit the corresponding central bank retain unlimited visibility into the full contract details of a given transaction (meeting the requirements that mandated use of the smart contract), but at the same time may impose progressive restriction regimes as to other network participants (e.g., imposing progressive restriction regimes as to PCBs, payers, payees, other central banks, etc.).

In addition to smart contracts, or as an alternative to smart contracts, transactions processed on the domestic or cross-border blockchain network may be encrypted to maintain privacy among and/or between PCBs. Further enhancing privacy, and although account-based and/or cash-based transactions may be processed and/or settled in real time or near real time in the accurate amounts, transactions may in some implementations be processed in batches or in multiple smaller amounts that sum up to the accurate amount (but are each on their own not the full accurate amount) as a way to provide further account privacy and reduce the load on the blockchain processing resources. Batch processing and/or split amount processing may further protect privacy for customers transactions and reduce computing load. For instance, batch processing may make it impossible for other parties to determine which transaction details (e.g., senders, amounts, etc.) in a batch correspond to the other transaction details (e.g., recipients, amounts, etc.).

Referring back now to FIG. 1, PCB 100*a*-100*f* may include respective PCB physical or virtual access points (not shown). An access point for a given PCB is a physical or virtual location where the bank's customers may purchase or sell CBDC from or to the PCB (which may involve a fee). Such access points are contemplated to take on many forms, without limitation, for enabling users to obtain CBDC with which to transact on the domestic and/or cross-border transaction network. For instance, an access point may take the form of an ATM machine wherein a user may deposit cash to the PCB in exchange for CBDC. In another example, an access point may take the form of a bank branch location wherein a user may transfer fiat cash or other acceptable forms of money from account to the teller at the PCB in exchange for a deposit of CBDC into the user's digital wallet. In another example, a user may simply leverage the PCBs legacy network (e.g., via their normal banking web portal) to exchange fiat-currency for a CBDC deposit into their digital wallet (or to an account associated with their digital wallet). Similarly, a user may cash out their CBDC at such access points by initiating an exchange of their CBDC holdings for an equivalent amount of fiat currency.

Central banks may deploy their own access points through which PCBs within their jurisdiction may be issued CBDC and whereby the central bank may put additional CBDC into circulation. A central bank may, for example, may maintain a general digital wallet through which it may issue (i.e., transfer) CBDC into an account or digital wallet of a PCB. The central bank may make a digital wallet application available to respective PCBs, and may permit such PCBs to issue requests and otherwise transact with the central bank's general digital wallet via the consortium chain or through the central banks legacy system (e.g., via an API call made through the PCB's digital wallet). Alternatively, a central bank may maintain one private digital wallet for each PCB, through which it may issue (i.e., transfer) CBDC into an account/digital wallet of each respective PCB. The central bank may make a digital wallet application available to respective PCBs, and may permit such PCBs to issue requests and otherwise transact with the central bank's private digital wallet (corresponding to a given PCB) via the consortium chain or through the central banks legacy system (e.g., via an API call made through the PCB's digital wallet).

Referring still to FIG. 1, account-based transactions between PCBs (which may be on their own behalf, or on behalf of the PCB's customers such as human clients, companies or other business concerns, organizations such as government organizations or educational systems, other banks, or other entities) may be processed on a consortium chain 110 or consortium chain 120. The domestic and/or cross-border blockchain transaction networks of the present disclosure may be configured to settle account-based transactions on a consortium blockchain on (1) a per-transaction and continuous basis (i.e., as soon as possible for each transaction), (2) on a per-transaction and periodic basis (i.e., in predefined intervals, e.g., every 30 seconds, every minute, every 5 minutes, every 10 minutes, every hour, every day, etc.), (3) on a batch settlement and continuous basis (i.e., as soon as possible for batches of simultaneously or near simultaneously executed transactions), and (4) on a batch settlement and periodic basis (i.e., in intervals for batches of transactions executed within the interval, e.g., every 30 seconds, every minute, every 5 minutes, every 10 minutes, every hour, every day, etc.).

Similarly, cash-based transactions between digital wallets (or accounts) of PCBs may be processed on a respective subchain blockchain 112a-112f, 122a-122f, depending on which PCBs hold the payer's and payee's digital wallets that are involved in the given transaction (or that hold the payers and payee's accounts where the transaction is of a small amount not exceeding a predefined threshold, and which may therefore be processed on a respective subchain blockchain). The domestic and/or cross-border blockchain transaction networks of the present disclosure may be configured to settle such cash-based transactions on a "subchain" blockchain on (1) a per-transaction and continuous basis (i.e., as soon as possible for each transaction, which for subchain blockchain processing may be in real time or near real-time), (2) on a per-transaction and periodic basis (i.e., in predefined intervals, e.g., every 30 seconds, every minute, every 5 minutes, every 10 minutes, every hour, every day, etc.), (3) on a batch settlement and continuous basis (i.e., as soon as possible for batches of simultaneously or near simultaneously executed transactions), and (4) on a batch settlement and periodic basis (i.e., in intervals for batches of transactions executed within the interval, e.g., every 30 seconds, every minute, every 5 minutes, every 10 minutes, every hour, every day, etc.).

When settling transactions, there may be certain relationship or transaction-based incentives to process and settle certain transactions over others. In connection with these incentives, PCBs (and/or central banks) may impose any desired or agreed upon prioritization to the settlement of submitted/incoming transaction processing requests. For instance, certain types of (or all) cash-based transactions can also be prioritized for settlement over certain types of (or all) interbank account-based transactions.

Similarly, when settling transactions, there may be certain computing resource incentives to process and settle certain transactions on the PCB's legacy transaction system instead of the consortium blockchain, and then later update the consortium blockchain with the relevant transaction details that would otherwise exist had the transaction been processed and settled via the consortium blockchain. Such incentives may include network load balancing and parallel computing efficiency incentives, depending on network usage at an given moment. In connection with these incentives, PCBs (and/or central banks) may impose any desired or agreed upon prioritization to the settlement of submitted/incoming transaction processing requests. For instance, certain types of (or all) interbank account-based transactions can also be prioritized for settlement on the legacy transaction system (to the extent possible) if the processing load on the consortium blockchain exceeds a predefined threshold. In another example, certain types of (or all) cash-based transactions can also be prioritized for settlement on the legacy transaction system (to the extent possible) if the processing load on the PCB's "subchain" blockchain exceeds a predefined threshold.

Figure 3C:
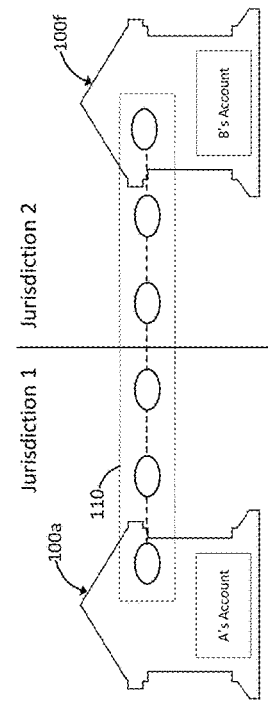
FIG. 3C illustrates a simplified view of an example system and another method for indirect foreign currency exchange in accordance with one or more embodiments of the present disclosure.
Figure 3D:
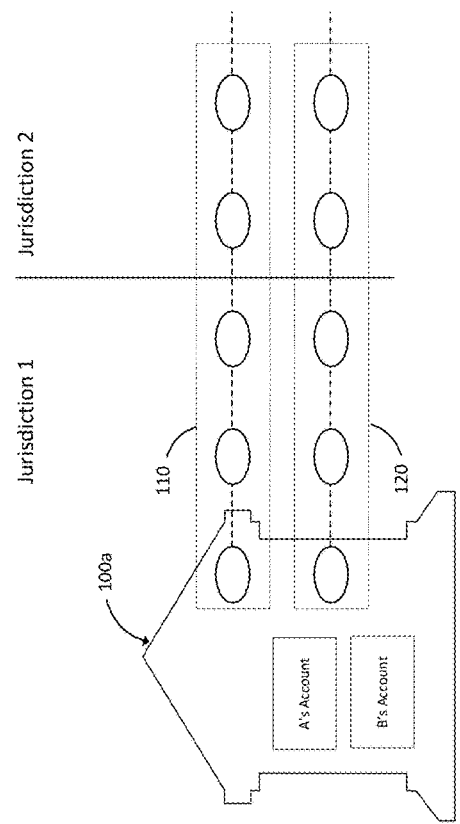
FIG. 3D illustrates a simplified view of an example system and method for direct foreign currency exchange where the two parties involved are members of the same bank, in accordance with one or more embodiments of the present disclosure.
Figure 3A:
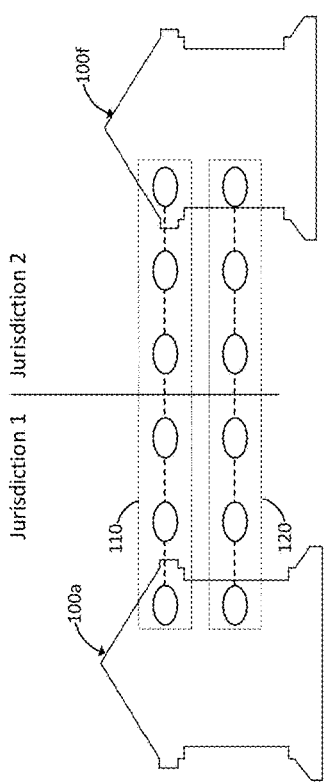
FIG. 3A illustrates a simplified view of an example system and method for direct foreign currency exchange in accordance with one or more embodiments of the present disclosure.
Figure 3B:
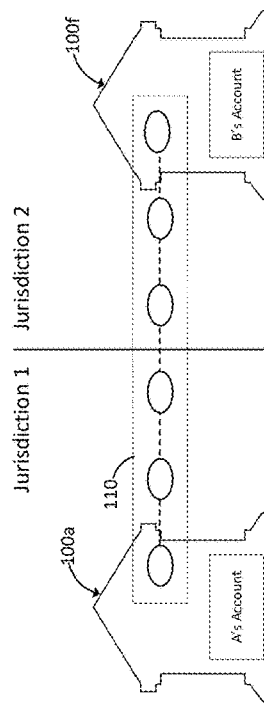
FIG. 3B illustrates a simplified view of an example system and method for indirect foreign currency exchange in accordance with one or more embodiments of the present disclosure.

In some embodiments of the present disclosure, the domestic and/or cross-border transaction network may be configured to enable customers to engage in transactions involving foreign currency exchanges over the consortium blockchain without having to take many of the steps involved in the conventional processes. FIGS. 3A-3C illustrates simplified views of the architecture illustrated in FIG. 1, with focus more specifically on PCBs 100a and 100f for purposes of description concerning foreign exchanges that may occur via one or more consortium chains. Reference numerals in FIGS. 3A-3C correspond to the same reference numerals presented in connection with FIG. 1.

FIG. 3A illustrates a simplified view of an example system and method for direct foreign currency exchange in accordance with one or more embodiments of the present disclosure. As shown, PCB 100a and PCB 100f each host a node of a first type CBDC consortium blockchain 110 and also hosting a node of a second type CBDC consortium blockchain 120. PCB 100a is understood to be located in a first jurisdiction (e.g., the United States) where the central bank for that jurisdiction mints and puts into circulation CBDC of a first type. Similarly, PCB 100f is in a second jurisdiction where the central bank for that jurisdiction mints and puts into circulation CBDC of a second type. For simplicity in this nonlimiting example, other elements, entities, and connections that may be present in a domestic and/or cross-border blockchain transaction network are not shown. PCB 100a and PCB 100f may process one or more transactions (which may be viewed as a series of partial transactions or "sub-transactions") to achieve (or allow its customers to achieve) a transaction that involves a foreign currency exchange on the consortium blockchains comprised in a domestic and/or cross-border blockchain transaction network. Although examples are provided herein illustrating where PCB 100a and 100f are in different jurisdictions, the same processes may also be carried out even as between PCBs in the same jurisdiction, such as between PCB 100a and 100b, for example.

By way of an illustrative example, suppose that PCB 100a is a bank in the United States where the U.S. Federal central bank has minted and issued to PCB 100a a repository of distributable USD-CBDC. Similarly, suppose that PCB 100f is a bank in France where the European Central Bank has minted and issued to PCB 100f a repository of distributable Euro-CBDC. To exchange an amount of USD-CBDC currency into Euro-CBDC currency, using the disclosed technology the PCB 100a need not make a traditional transfer (or wire transfer) of USD-fiat currency (US Dollars) to PCB 100f and await settlement of the transaction among PCB 100a in the US and a deposit of Euro-CBDC from PCB 100f. Instead, PCB 100a may process the foreign currency exchange directly with PCB 100*f* over the consortium chain technology in one of at least two ways.

First, if PCB 100*a* has set up an individual account (as a customer) with PCB 100*f*, then the following process may take place. PCB 100*f* debits (from PCB 100*a*'s USD-fiat account or USD-CBDC digital wallet) USD-fiat or USD-CBDC from PCB 100*a* in the designated amount. Next (or simultaneously), PCB 100*f* then credits (into PCB 100*a*'s Euro account or Euro digital wallet) an amount of Euro's at the designated exchange rate to PCB 100*a*. Next (or simultaneously), PCB 100*f* debits (from its own Euro-fiat account or Euro-CBDC digital wallet) the designated amount of Euro-CBDC from PCB 100*f*. Next (or simultaneously), PCB 100*f* credits (into PCB 100*f*'s USD-fiat account or USD-CBDC digital wallet) the amount of USD-fiat or USD-CBDC. The aforementioned foreign currency exchange may occur in accordance with a time-dependent dynamic exchange rate. PCB 100*f* may impose a fee (imposing a spread) on PCB 100*a* for the foreign currency exchange it requested. If PCB 100*a* has not set up an individual account (as a customer) with PCB 100*f*, but is connected to PCB 100*f* through the consortium chains 110 and 120 for USD-CBDC and Euro-CBDC, respectively, both as PCBs, then the following process may take place. PCB 100*a* may issue a command to the US-CBDC consortium blockchain 110 to debit an amount of USD-CBDC balance from its own account or digital wallet and send/transfer the same to PCB 100*f* through USD-CBDC consortium blockchain 110. Next (or simultaneously), the USD-CBDC consortium blockchain 110*a* debits PCB 100*a*'s account or digital wallet by the designated amount of USD-CBDC. Next (or simultaneously), the USD-CBDC consortium blockchain 110*a* credits PCB 100*f*'s account or digital wallet in the designated amount of USD-CBDC. PCB 100*f* reflects the USD-CBDC in its account or digital wallet. PCB 100*f* issues a command to the Euro-CBDC consortium blockchain 110*b* to debit Euro-CBDC from PCB 100*f*'s account or digital wallet and sends Euro-CBDC to PCB 100*a* through the Euro-CBDC consortium blockchain 110*b*. The Euro-CBDC consortium blockchain 110*b* debits PCB 100*f*'s wallet and credits PCB 100*a*'s bank's wallet in the designated amount of Euro-CBDC. PCB 100*a* reflects the designated amount of Euro-CBDC into PCB 100*a*'s Euro-CBDC wallet or account. As an alternative to using the consortium blockchain for such exchanges, all or part of the aforementioned processes may occur via a legacy system of the PCB (e.g., via a traditional wire exchange between accounts). The details of transactions pushed onto a legacy system for processing may be synced with the relevant CBDC consortium blockchains to ensure such blockchains have current visibility into the fiat and cryptocurrency holdings of respective members and other network participants (as may be allowed or disallowed by the applicable smart contract).

FIG. 3B illustrates a simplified view of an example system and method for indirect foreign currency exchange or international money remittance in accordance with one or more embodiments of the present disclosure. In the illustrated example, an account holding customer of PCB 100*a* (or PCB 100*a* itself through its own account) may perform an indirect foreign exchange of one type of CBDC from a first jurisdiction (e.g., USD-CBDC) for another type of fiat currency local to another jurisdiction (e.g., Euro fiat currency). The Euro fiat currency may come from an account holding customer of a foreign PCB 100*f* (or from PCB 100*f* itself through its own account). As shown, the USD CBDC Chain 110 debits from customer A's account (or from PCB 100*a*'s own USD-CBDC account) the designated amount of USD-CBDC. Next (or simultaneously), USD CBDC Chain 110 then credits into PCB 100*f*'s USD-CBDC account the designated amount of US-CBDC. Next (or simultaneously) PCB 100*f* exchanges the USD-CBDC into local fiat (e.g., Euro-fiat) at the current exchange rate. Next (or simultaneously), if performing the exchange in connection with customer B (as the payee), PCB 100*f* debits the exchanged amount of Euro-fiat from its own Euro-fiat account and then credits the same into customer B's Euro-fiat bank account. The aforementioned foreign currency exchange may occur in accordance with a time-dependent dynamic exchange rate. PCB 100*f* may impose a fee (imposing a spread) on PCB 100*a* for the foreign currency exchange it requested.

FIG. 3C illustrates a simplified view of an example system and another method for indirect foreign currency exchange or international remittance in accordance with one or more embodiments of the present disclosure. In the illustrated example, an account holding customer of PCB 100*a* (or PCB 100*a* itself through its own account) may perform an indirect foreign exchange of one type of fiat currency from a first jurisdiction (e.g., Japanese Yen or JPY-fiat currency) for another type of fiat currency local to another jurisdiction (e.g., Hong Kong Dollar or HKD-fiat currency) indirectly through a background exchange of CBDC currencies. The foreign currency (e.g., the HKD fiat currency in this example) that is ultimately obtained may come from an account holding customer of a foreign PCB 100*f* (or from PCB 100*f* itself through its own account). As shown, node 110*a* of PCB 100*a* debits from customer A's account (or from PCB 100*a*'s own JPY-fiat account) the designated amount of JPY-fiat. Next (or simultaneously), node 110*a* of PCB 100*a* exchanges the JPY-fiat currency into USD-CBDC and deposits the USD-CBDC into PCB 100*a*'s own USD-CBDC account. Next (or simultaneously), node 110*a* of PCB 100*a* debits the amount of USD-CBDC currency from PCB 100*a*'s own USD-CBDC account and issues a transfer command to node 110*f* of PCB 100*f* through the USD-CBDC consortium chain 110. Responsively, node 110*f* of PCB 100*f* causes the designated amount of US-CBDC to be credited into its own US-CBDC account. Next (or simultaneously), PCB 100*f* then exchanges the USD-CBDC into local fiat (e.g., HKD-fiat currency) at the current foreign currency exchange rate. Next (or simultaneously), if performing the exchange in connection with customer B (as the payee), PCB 100*f* debits the exchanged amount of HKD-fiat from its own HKD-fiat account and then credits the same into customer B's HKD-fiat bank account. Again, the aforementioned foreign currency exchange may occur in accordance with a time-dependent dynamic exchange rate. PCB 100*f* may impose a fee (imposing a spread) on PCB 100*a* for the foreign currency exchange it requested.

Although in some of the aforementioned examples, PCBs 100*a* and 100*f* themselves initiating a request for such a foreign currency exchange, it should be appreciated (especially with reference to "customers" throughout the foregoing descriptions) that the same processes may be carried out by the PCBs 100*a*, 100*f* on behalf of their respective customers, including but not limited to those non-participating banks that have partnered with the PCBs (i.e., NPBs), who may initiate requests for such foreign currency exchanges through the account, digital wallet or API that communicatively couples such customers to respective PCBs.

Furthermore, and particularly in connection with FIGS. 3B-3C, in countries without CBDC currency and without the infrastructure to support the domestic and/or cross-border blockchain transaction networks of the present disclosure in their entirety, banking institutions in such countries may become a node in the consortium chain (albeit only to host consortium blockchains corresponding to CBDC issued by other countries' central banks), and thereby issue calls (on behalf of themselves or their customers, which may include NPBs) to the consortium chain and initiate an indirect conversion of local currency into any type of CBDC (and vice versa) through a PCB's node, and similarly convert the CBDC it obtains into local currency through its legacy transaction network. Even if the non-participating bank does not host a node of any consortium chain, they may still establish a partnership with a PCB (e.g., through an API, digital wallet, account, or otherwise) to have such conversions conducted on its behalf.

Further still, if both the payee and payer in a given scenario hold bank accounts in countries without the infrastructure to support the domestic and/or cross-border blockchain transaction networks of the present disclosure in their entirety, they may still transact using the domestic and/or cross-border blockchain transaction networks of the present disclosure by becoming a PCB, becoming an account holding member of a commercial bank that has formed a relationship/partnership with a PCB (such as an NPB), or themselves forming a partnership with a PCB. In some embodiments, payer and payee may participate in the domestic and/or cross-border blockchain transaction networks of the present disclosure either through its own local bank (which may host servers that operate as a node in the network (i.e., as a PCB) as explained above) or through an NPB providing a digital wallet, account, or API connection to a partnering PCB that hosts a node of the domestic and/or cross-border blockchain transaction networks of the present disclosure. Once in receipt of the CBDC deposit into its digital wallet, the payee may convert such CBDC into local currency with its traditional local banking network, and vice versa. For example, A in A's country may wish to convert or send payer A's country's fiat money into B in B's country's fiat money. A gives A's bank A's country's fiat currency. A's bank converts that fiat currency amount into CBDC issued by country C and sends (by itself or through its partner) country C's CBDC to B's bank (by itself or partner) in B's country, over CBDC blockchain managed by country C. B's bank then converts country C's CBDC to B's country's fiat money and gives to B.

Although FIGS. 3A-3C are discussed in the context where the two accounts (or digital wallets) between which the foreign currency exchange is taking place are held at different PCBs, the technology solutions of the present disclosure can also be carried out (and sometimes modified to achieve even greater efficiencies and/or reliability) where the accounts (and/or digital wallets) are held at the same PCB—for instance, where two different customers both hold accounts with the same PCB, or where a customer of a bank is engaging in an exchange with the PCB's own account (which it holds for itself). FIG. 3D illustrates a simplified view of an example system and method for direct foreign currency exchange where the two parties involved have bank accounts (and/or digital wallets) with the same PCB, in accordance with one or more embodiments of the present disclosure. In this example, As shown, PCB 100a hosts a node of a first type CBDC consortium blockchain 110 and also a node of a second type CBDC consortium blockchain 120. PCB 100a is understood to be located in a first jurisdiction (e.g., the United States) where the central bank for that jurisdiction mints and puts into circulation CBDC of a first type. For simplicity in this nonlimiting example, other elements, entities, and connections that may be present in a domestic and/or cross-border blockchain transaction network are not shown. PCB 100a may process one or more transactions (which may be viewed as a series of partial transactions or "sub-transactions") to achieve (or allow its customers to achieve) a transaction that involves a foreign currency exchange on the consortium blockchains comprised in a domestic and/or cross-border blockchain transaction network.

By way of an illustrative example, suppose that PCB 100a is a bank in the United States where the U.S. Federal central bank has minted and issued to PCB 100a a repository of distributable USD-CBDC. Similarly, suppose that PCB 100a has a repository of distributable Euro-CBDC, and/or has partnered with one or more other PCBs through which it may obtain Euro-CBDC over the Euro-CBDC consortium chain. For an account holding member, A, of PCB 100a to exchange an amount of USD-CBDC currency into Euro-CBDC currency, it may submit a request to PCB 100a and PCB 100a may execute the following process. PCB 100a may process the foreign currency exchange directly over the consortium chain technology of the present disclosure. To achieve this, PCB 100a may cause USD-CBDC consortium chain 110 to debit (from A's USD-fiat account or USD-CBDC digital wallet) USD-fiat or USD-CBDC from customer A in the designated amount. Next (or simultaneously), PCB 100a debits (from its own Euro-fiat account or Euro-CBDC digital wallet) a designated amount of Euro-CBDC at the designated exchange rate. Next (or simultaneously), PCB 100a then credits (into A's Euro account or Euro digital wallet) the designated amount of Euro-CBDC. Next (or simultaneously), PCB 100a credits (into its own USD-fiat account or USD-CBDC digital wallet) the amount of USD-fiat or USD-CBDC. The aforementioned foreign currency exchange may occur in accordance with a time-dependent dynamic exchange rate. PCB 100a may impose a fee (imposing a spread) on customer A for the foreign currency exchange it requested.

A similar process may be carried out where customer A is wishing to complete the foreign currency exchange with another customer of PCB 100a (as opposed to exchanging the currency with PCB 100a itself). For instance, for an account holding member, A, of PCB 100a to exchange an amount of USD-CBDC currency into Euro-CBDC currency with another account holding member, B, of PCB 100a, customer A may submit a request to PCB 100a and PCB 100a may execute the following process. PCB 100a may again process the foreign currency exchange directly over the consortium chain technology of the present disclosure, this time coordinating debits/credits from/to member B's account as well. To achieve this, PCB 100a may cause USD-CBDC consortium chain 110 to debit (from A's USD-fiat account or USD-CBDC digital wallet) USD-fiat or USD-CBDC from customer A in the designated amount. Next (or simultaneously), PCB 100a causes Euro-CBDC consortium chain 120 to debit (from customer B's Euro-fiat account or Euro-CBDC digital wallet) a designated amount of Euro-CBDC at the designated exchange rate. Next (or simultaneously), PCB 100a then credits (into A's Euro account or Euro digital wallet) the designated amount of Euro-CBDC. Next (or simultaneously), PCB 100a credits (into customer B's USD-fiat account or USD-CBDC digital wallet) the amount of USD-fiat or USD-CBDC. The aforementioned foreign currency exchange may occur in accordance with a time-dependent dynamic exchange rate. PCB 100a may impose a fee (imposing a spread) on customer A and/or customer B for the foreign currency exchange customer A requested.

As an alternative to using the consortium blockchain for such exchanges involving either a member and the PCB it holds an account with, or involving two members of a single PCB, all or part of the aforementioned processes may occur via a legacy system of the PCB (e.g., via a traditional wire exchange between accounts). The details of transactions pushed onto a legacy system for processing may be synced with the relevant CBDC consortium blockchains to ensure such blockchains have current visibility into the fiat and cryptocurrency holdings of respective members and other network participants (as may be allowed or disallowed by the applicable smart contract).

Referring back now to FIG. 1, as noted previously a given PCB may host a number of subchain blockchains configured for processing cash-based transactions. In some instances, however, situations arise where benefits arise from utilizing subchains and consortium chains to permit prompt processing of transactions on subchains while permitting certain settlements to occur over the consortium chains. In some embodiments, cross-subchain transactions are also contemplated. The foregoing will now be discussed in greater detail with reference to FIGS. 4A-4C.

Figure 4A:
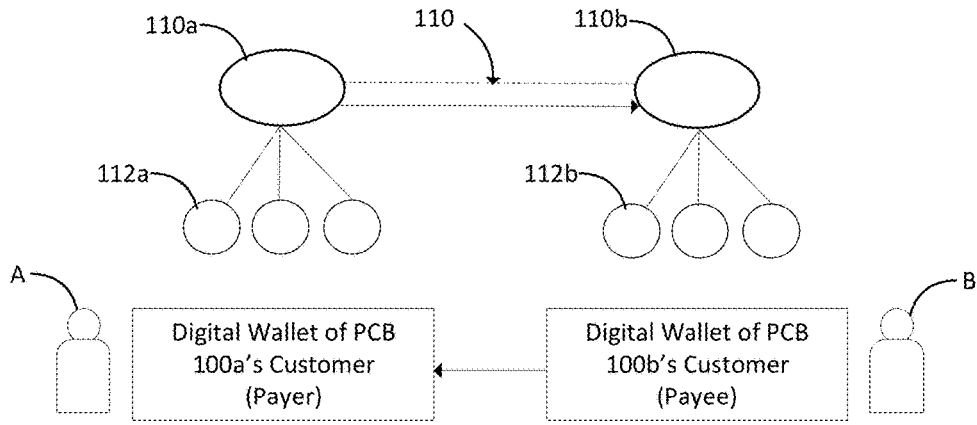
FIG. 4A illustrates an example subchain supported transaction in accordance with one or more embodiments of the present disclosure.
Figure 4B:
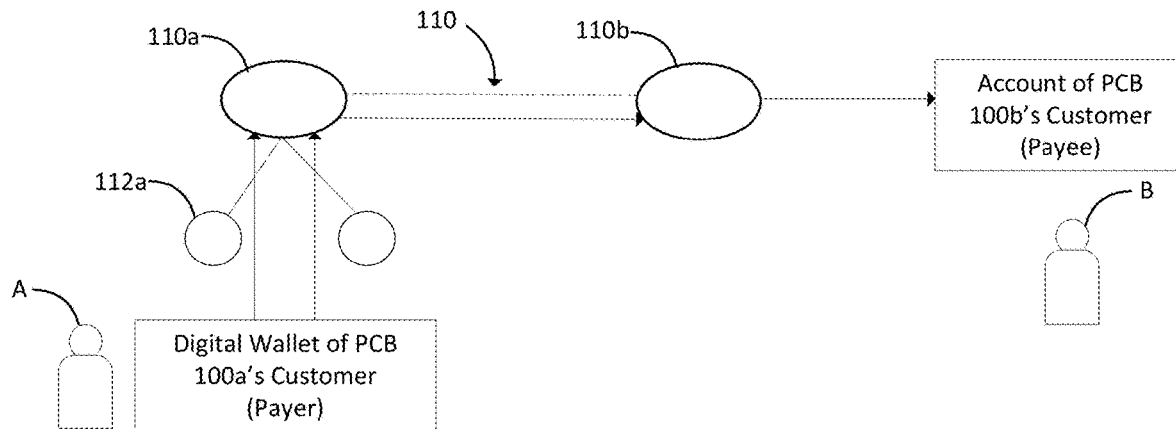
FIG. 4B illustrates an example subchain supported transaction in accordance with one or more embodiments of the present disclosure.
Figure 4C:
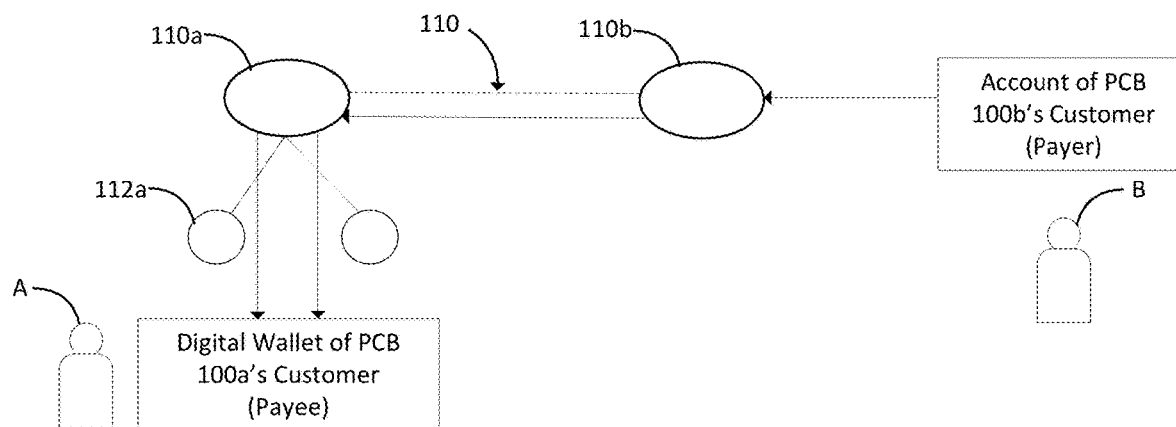
FIG. 4C illustrates an example subchain supported transaction in accordance with one or more embodiments of the present disclosure.

FIGS. 4A-4C illustrate various transactions involving both subchains and consortium chain operability. FIG. 4A illustrates a transaction wherein a payer transfers CBDC from its own digital wallet into the digital wallet of a payee's digital wallet. Though such transactions may be either initiated by the payer or requested by the payee, in the illustrated scenario the payee B requests payment from the payer A by sending a communication from payee B's digital wallet to payer A's digital wallet (via a Wallet ID, an IP address, a handle, or other identifier) through the participants' respective PCB's subchains. In particular, subchain 112b interprets the address identified in payee B's request and responsively transmits a notification to payer A's digital wallet. The notification including the request may be provided to payer A's digital wallet either through (1) subchain 112b, (2) subchain 112a, (3) both subchain 112a and subchain 112b, and/or (4) main chain 110. Payer A may approve the request upon receiving the notification through his/her digital wallet. Upon approval, subchain 112a may determine (based on the received wallet address) if payee B (the owner of the digital wallet that is supposed to receive funds) is a member or otherwise belongs to subchain 112a. If so, subchain 112a will determine if payer A's digital wallet has a sufficient balance to satisfy the request from payee B. If subchain 112a determines that Payer A has a sufficient balance to support the requested payment to Payee B, subchain 112a will debit Payer A's wallet the amount of the CBDC request (optionally, with an additional fee) and credit Payee B's digital wallet with the requested amount of CBDC (optionally, less an additional fee). If, on the other hand, subchain 112a determines that payee B (the owner of the digital wallet that is supposed to receive funds) is not a member of PCB 100a, and is instead only a member of PCB 100b (and assuming that PCB 100a and 100b are different banks), subchain 112a will determine which PCB the payee B belongs to (or which subchain Payee B's wallet belongs to) based on the address of Payee B's digital wallet. Once identified, subchain 112a will determine if Payee A's digital wallet has a sufficient balance to satisfy the request from Payee B. If so, subchain 112a will debit Payer A's digital wallet by the requested amount of CBDC, and then transmit a notification to PCB 110b (through coupling of subchain 112a and subchain 112b, or consortium chain 110) to cause a credit to be temporarily made into Payee B's digital wallet. Thereafter, PCB 100a and PCB 100b will periodically settle the temporary credits and debits requested of one another (these may be referred to as cross-subchain requests) as well as other transactions that might require settlement on the consortium chain. Once settled, PCB 100b will confirm the transaction and thereafter the temporary credit becomes permanent in Payee B's digital wallet and is useable (without restriction) in subsequent transactions by Payee B. Until settlement is complete however, either or both of PCB 100a and 100b may impose restrictions on Payee B's ability to use the CBDC temporarily credited into its digital wallet.

If either of subchains 112a and 112b determine that PCB 100a and PCB 100b are in fact the same bank (but possibly different subchains), a more streamlined process may ensue. In particular, subchain 112a may determine if Payer A's digital wallet has a sufficient balance to satisfy the request from payee B. If so, subchain 112a debits Payer A's digital wallet in the requested amount (optionally, with an additional fee) and then transmit a notification to subchain 112b to temporarily credit Payee B's digital wallet (optionally, less an additional fee). Because PCB 100a and PCB 100b are the same bank, the transaction may be settled without any reliance on the consortium chain, and instead may be settled internally across subchains and/or using the bank's legacy system. Once settled, temporary credit becomes permanent in Payee B's digital wallet and is useable (without restriction) in subsequent transactions by Payee B.

In addition to digital wallet-to-digital wallet transactions, subchains may also be configured to process digital wallet-to-account transactions (FIG. 4B) and account-to-digital wallet transactions (FIG. 4C). Note that while the payer and payee jargon is used in connection with these figures, it should be appreciated that in each of the examples set forth in FIGS. 4B and 4C, the payer and payee can be the same user (i.e., the transaction may simply be a deposit or a withdrawal into or from the user's own accounts/digital wallets).

FIG. 4B. illustrates a subchain process involving a wallet-to-account transaction. As shown, if a customer A is simply making a direct CBDC deposit or payment from their digital wallet into their or another payee's account at the same PCB, they can simply submit a request (through their wallet) to subchain 112a, which will couple with consortium chain 110 to process the transaction as described above. In the event that customer A desires to transfer CBDC from their digital wallet into an account held by a different bank, additional steps may be necessary. For example, PCB 100a may validate customer A and verify the balance held in customer A's digital wallet to ensure it is sufficient to support the proposed CBDC transfer. Customer A may be required to authenticate him/herself to PCB 100a (e.g., with a signature, biometrics, 2FA or otherwise). Upon validation, the transaction will be processed using the cross-subchain settlement process (including a debit from customer A's digital wallet hosted by subchain node 112a and a temporary credit into customer B's account with PCB 100b until the transaction is settled on the consortium chain 110, which occurs periodically).

FIG. 4C illustrates a subchain process involving an account-to-wallet transaction. As shown, if a customer B desires to make a direct CBDC withdrawal, payment, or other movement of CBDC from their account at PCB 100b into their own digital wallet or another person's digital wallet at the same PCB, they can simply submit a request (through their account or their digital wallet) to subchain 112a, which will couple with consortium chain 110 to process the transaction as described above. In the event that customer B desires to transfer CBDC from their account into a digital wallet held by a different bank (i.e., hosted by a different PCB's subchain), additional steps may be necessary. For example, PCB 100b may validate customer B and verify the balance held in customer B's account to ensure it is sufficient to support the proposed CBDC transfer to customer A. Customer B may be required to authenticate him/herself to PCB 100b (e.g., with a signature, biometrics, 2FA or otherwise). Upon validation, the transaction will be processed using the cross-subchain process (including a debit from customer B's account with PCB 100b and a temporary credit to customer A's digital wallet until the transaction is settled on the consortium chain 110, which may occur periodically).

In some embodiments, payments received pursuant to a transaction processed through cross-subchain blockchains may not be used by the recipient, e.g., for the next transaction, until settled (which may be in real-time, near real-time, and/or in intervals on a periodic basis, e.g., every 5 seconds, every 30 seconds, every 5 minutes, every 30 minutes, every day, etc.

It should be appreciated that the smart contract technologies of the present disclosure may be similarly applied by PCBs to regulate visibility of transactions details (or even the existence of a transaction) occurring at the subchain level. For example, a PCB may execute one or more of the above example transactions utilizing a smart contract that restricts visibility of the transaction details (or even the existence of the transaction) to the PCB itself, restricts visibility of the transaction details (or even the existence of the transaction) to the PCB itself and the payer and payee participants themselves, or in accordance with any other predefined regime. Such regimes may include the progressively restrictive smart contracts that may be defined as desired by the individual PCB's that provide nodes to process requested transactions.

Figure 5A:
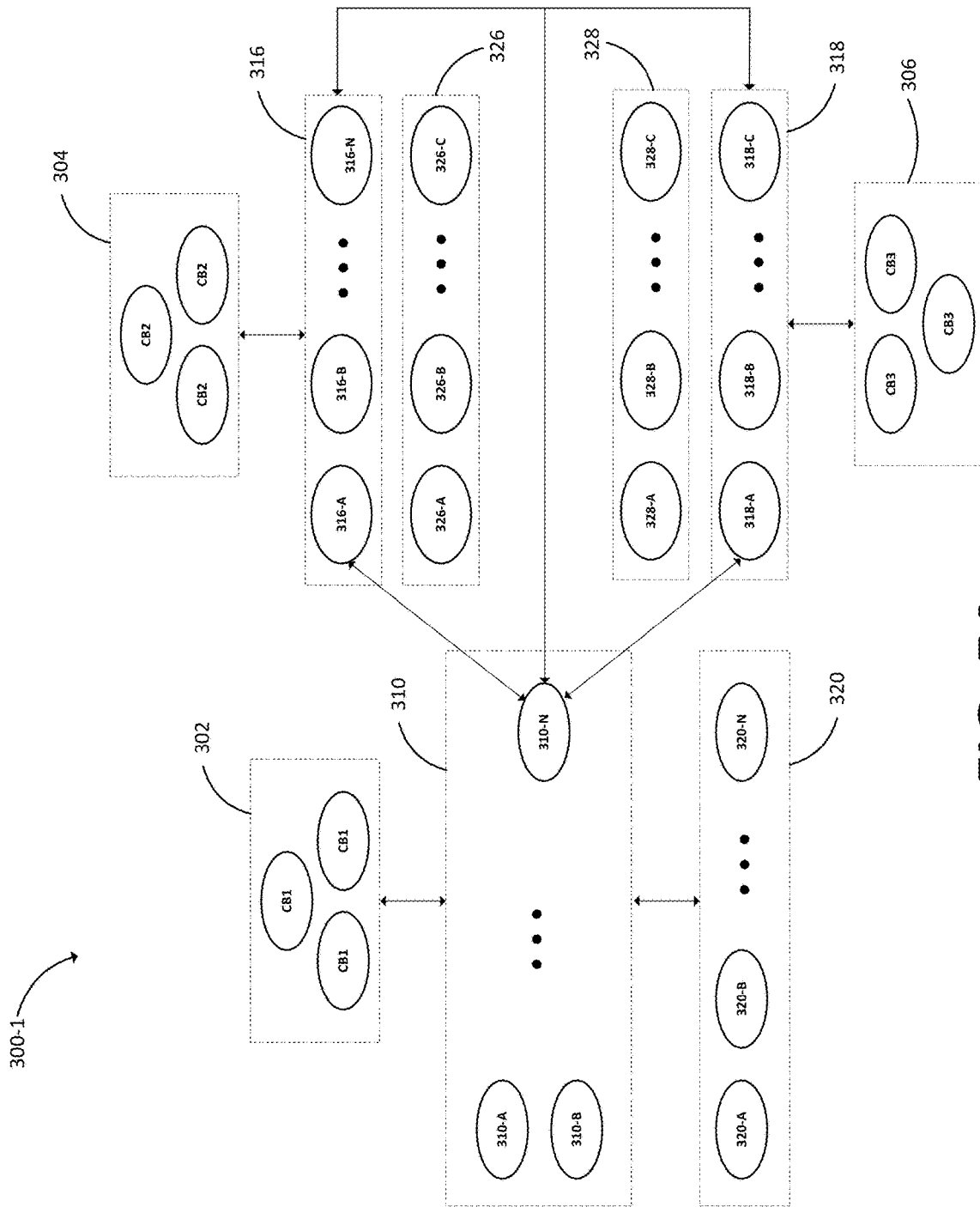
FIG. 5A illustrates an example domestic and/or cross-border blockchain transaction network in accordance with one or more embodiments of the present disclosure.
Figure 5B:
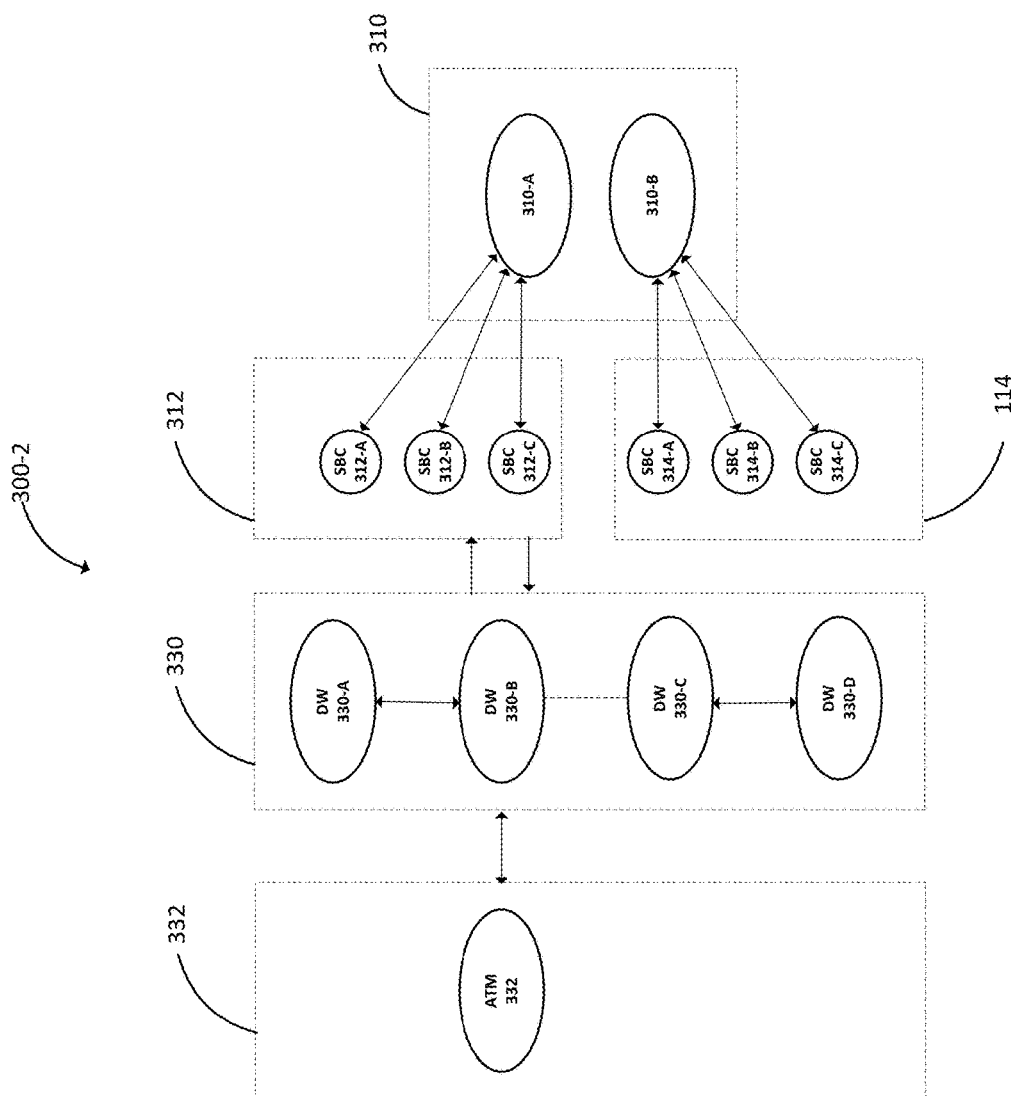
FIG. 5B illustrates another example domestic and/or cross-border blockchain transaction network in accordance with one or more embodiments of the present disclosure.
Figure 5C:
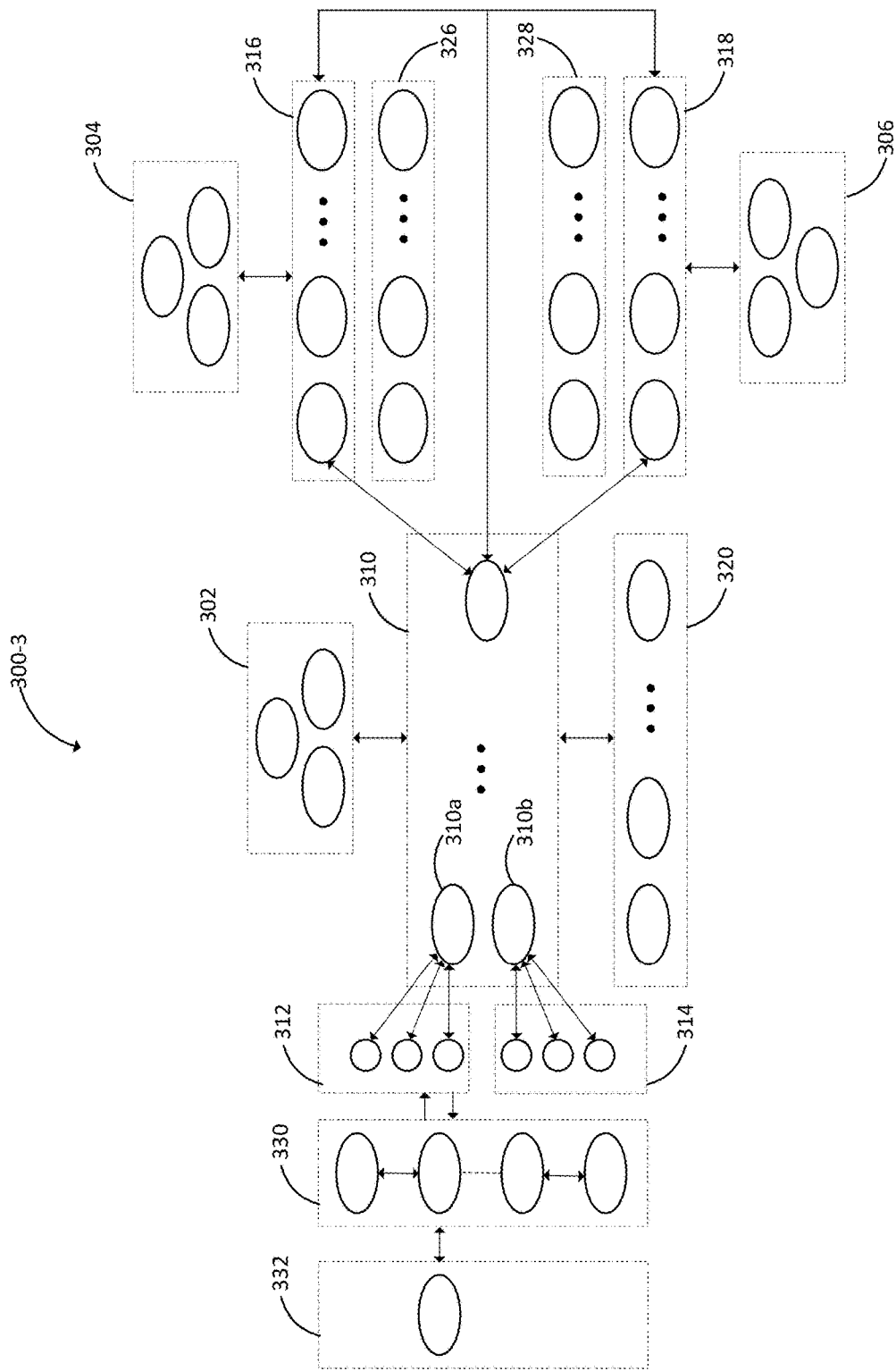
FIG. 5C illustrates an example aggregated domestic and/or cross-border blockchain transaction network in accordance with one or more embodiments of the present disclosure.

FIGS. 5A-5C illustrate a system similar in architecture to the system in FIG. 1, but depicting added detail and providing an example where such architecture is extended to a third jurisdiction (the same type of extension being applicable to any N-number of jurisdictions). FIG. 5A illustrates an three jurisdiction/three CBDC example system 300-1 in accordance with one or more embodiments of the present disclosure. System 300-1 includes one or more central bank nodes 302 associated with a first central bank, one or more central bank nodes 304 associated with a second central bank, and one or more central bank nodes 306 associated with a third central bank.

Central bank nodes 302 may be located in a first jurisdiction over which the first central bank exercises control (e.g., is authorized to mint, issue, receive, and burn at least one type of CBDC as legal tender in the first jurisdiction). Additionally or alternatively, one or more central bank nodes 302 may be located outside of the first jurisdiction over which the first central bank exercises control; but may be dedicated, in whole or in part, to interacting with network participant's computing devices located within or outside the first jurisdiction that are making requests, transactions, calls, or otherwise exchanging messages with such central bank nodes.

Central bank nodes 304 may be located in a second jurisdiction over which the second central bank exercises control (e.g., is authorized to mint, issue, receive, and burn at least one type of CBDC as legal tender in the second jurisdiction). Additionally or alternatively, one or more central bank nodes 304 may be located outside of the second jurisdiction over which the second central bank exercises control; but may be dedicated, in whole or in part, to interacting with network participant's computing devices located within or outside the second jurisdiction that are making requests, transactions, calls, or otherwise exchanging messages with such central bank nodes.

Central bank nodes 306 may be located in a third jurisdiction over which the third central bank exercises control (e.g., is authorized to mint, issue, receive, and burn at least one type of CBDC as legal tender in the third jurisdiction). Additionally or alternatively, one or more central bank nodes 306 may be located outside of the third jurisdiction over which the third central bank exercises control; but may be dedicated, in whole or in part, to interacting with network participant's computing devices located within or outside the third jurisdiction that are making requests, transactions, calls, or otherwise exchanging messages with such central bank nodes.

Any number of central banks having clusters of one or more central bank nodes in any number of jurisdictions may be utilized, and the illustration of three such clusters of central bank nodes in FIG. 5A should not be understood to be limiting. Indeed, in an ideal global implementation of the technology disclosed herein, central banks from every jurisdiction that mints some form of CBDC would be configured to be a participant in the disclosed systems (with clusters of their own connecting central bank nodes, or through partnerships with banks that do have connected central bank nodes, etc.). As such, persons of ordinary skill in the art will appreciate that the examples provided herein are illustrative of example systems, but that the technology disclosed herein is scalable to any number of network participants (e.g., central banks, PCBs, partners of central and/or PCBs, customers of central and/or PCBs) as may be progressively desirable with increased adoption.

System 300-1 includes one or more PCB nodes 310 associated with a plurality of PCBs that maintain situs in a first jurisdiction (the same jurisdiction as the first central bank discussed above for this illustrative example), one or more PCB nodes 316 associated with a plurality of PCBs that maintain situs in a second jurisdiction (the same jurisdiction as the second central bank discussed above for this illustrative example), and one or more PCB nodes 318 associated with a plurality of PCBs that maintain situs in a third jurisdiction (the same jurisdiction as the third central bank discussed above for this illustrative example). PCB nodes 310 may be located in a first jurisdiction (where the PCBs that the nodes are associated with maintain situs, and over which the first central bank exercises control). Additionally or alternatively, one or more PCB nodes 310 may be located outside of the first jurisdiction; but may be dedicated, in whole or in part, to interacting with network participant's computing devices (e.g., mobile devices) that are making requests, transactions, calls, or otherwise exchanging messages with such PCB nodes 310. In some embodiments, the one or more PCB nodes 310 may be dedicated to handling only direct interactions with network participant computing devices when those devices are physically or virtually (e.g., through VPN) located within the same jurisdiction that the PCB nodes 310 are physically or virtually located within. In some embodiments, the one or more PCB nodes 310 may, in addition to handling interactions with network participant computing devices in the same jurisdiction, also be configured to handle—directly or indirectly—interactions with network participant computing devices physically or virtually located outside the jurisdiction within which the PCB nodes 310 are physically or virtually located.

PCB nodes 316 may be located in a second jurisdiction (where the PCBs that the nodes are associated with maintain situs, and over which the second central bank exercises control). Additionally or alternatively, one or more PCB nodes 316 may be physically or virtually located outside of the second jurisdiction; but may be dedicated, in whole or in part, to interacting with network participant's computing devices located physically or virtually in the second jurisdiction that are making requests, calls, or otherwise exchanging messages with such PCB nodes 316. In some embodiments, the one or more PCB nodes 316 may be dedicated to handling only direct interactions with network participant computing devices when those devices are physically or virtually (e.g., through VPN) located within the same jurisdiction that the PCB nodes 316 are physically or virtually located within. In some embodiments, the one or more PCB nodes 316 may, in addition to handling interactions with network participant computing devices in the same jurisdiction, also be configured to handle—directly or indirectly—interactions with network participant computing devices physically or virtually located outside the jurisdiction within which the PCB nodes 316 are physically or virtually located.

PCB nodes 318 may be located in a third jurisdiction (where the PCB s that the nodes are associated with maintain situs, and over which the third central bank exercises control). Additionally or alternatively, one or more PCB nodes 318 may be located outside of the third jurisdiction; but may be dedicated, in whole or in part, to interacting with network participant's computing devices located in the third jurisdiction that are making requests, transactions, calls, or otherwise exchanging messages with such PCB nodes 318. In some embodiments, the one or more PCB nodes 318 may be dedicated to handling only direct interactions with network participant computing devices when those devices are physically or virtually (e.g., through VPN) located within the same jurisdiction that the PCB nodes 318 are physically or virtually located within. In some embodiments, the one or more PCB nodes 318 may, in addition to handling interactions with network participant computing devices in the same jurisdiction, also be configured to handle—directly or indirectly—interactions with network participant computing devices physically or virtually located outside the jurisdiction within which the PCB nodes 318 are physically or virtually located.

The account (referenced above) of a given PCB may be in operative communication with a node of the PCB (as well as other blockchain nodes with which PCB node may be connected). The account of a given PCB may be accessible through a computing device of the PCB, and may be configured to connect with a transaction management utility of the system, whereby such PCB can cause a blockchain to send, receive, and exchange CBDC (and request or relay requests therefor) to/from other network participants (including respective central banks) in connection with one or more transactions, orders, or exchanges (which may collectively be referred to as "transactions"). The transaction management utility is configured to take input received through the computing device of a respective PCB (or through an authorized computing device of a customer of such respective PCB to whom the PCB provided an application through which such transaction management utility may be accessed, e.g., under predefined conditions), and communicate a command to a blockchain of the system (e.g., a relevant consortium blockchain discussed herein, a relevant subchain blockchain discussed herein, etc.) to cause, directly or indirectly, the corresponding blockchain to execute, alone or together with another blockchain and/or additional resources, a CBDC based transaction indicated by the input. The transaction management utility may also be configured automatically communicate a command to a blockchain of the system based on a triggering event, or a predefined rule or criteria/condition, to cause the blockchain to execute, alone or together with another blockchain and/or additional resources, a CBDC based transaction. Example accounts are shown symbolically in the illustrated example in FIG. 5A as individual ovals within the box outlines indicated by numerals 320, 326 and 328.

Any number of central banks having one or more central bank nodes in any number of jurisdictions may be utilized, and the illustration of three such clusters of central bank nodes in FIG. 5A should not be understood to be limiting. Indeed, in an ideal global implementation of the technology disclosed herein, central banks from every jurisdiction that mints some form of CBDC would be configured to be a participant in the disclosed systems (with clusters of their own connecting central bank nodes, or through partnerships with banks that do have connected PCB or central bank nodes, etc.). As such, persons of ordinary skill in the art will appreciate that the examples provided herein are illustrative of example systems, but that the technology disclosed herein is scalable to any number of network participants (e.g., central banks, PCBs, partners of central and/or PCBs, customers of central and/or PCBs) as may be progressively desirable with increased adoption.

Similarly, any number of PCBs having one or more PCB nodes in any number of jurisdictions may be utilized, and the illustration of three PCB nodes (each of which may correspond to a different PCB) in FIG. 5A should not be understood to be limiting. Indeed, in an ideal global implementation of the technology disclosed herein, every PCB from every participating jurisdiction (including those jurisdictions where CBDC is minted in some form by a central bank) would be configured to be a participant in the disclosed systems (in some examples, with clusters of their own connecting PCB nodes, or through partnerships with PCBs that have connected PCB nodes, etc.). As such, persons of ordinary skill in the art will appreciate that the examples provided herein are illustrative of example systems, but that the technology disclosed herein is scalable to any number of network participants in participating jurisdictions (e.g., central banks, PCBs, partners of central and/or PCBs, customers of central and/or PCBs) as may be progressively desirable with increased adoption.

Any one of the aforementioned "nodes" may be configured to host all or part of a blockchain for processing transactions that utilize CBDC, including as described in the nonlimiting examples provided herein. A network participant may provide (or otherwise be associated with) a single node, or may provide (or otherwise be associated with) a plurality of nodes. Nodes may be embodied in one or more physical and/or virtual servers, including as described in the nonlimiting examples provided herein. Together, collections of nodes within the system 300-1 may embody all or part of one or more of the blockchains configured to process the CBDC based transactions contemplated by the present disclosure.

FIG. 5B illustrates another example system in accordance with one or more embodiments of the present disclosure. System 300-2 includes two example PCB nodes 310, namely commercial bank node 310-A associated with a first PCB and commercial bank node 310-B associated with a second PCB. As shown, each PCB may also maintain one or more subchain blockchain nodes configured to process transactions between (1) account holders of the first PCB (including NPBs), (2) account holders of the second PCB (including NPBs), and/or (3) an account holder of the first PCB and an account holder of the second PCB (including NPBs), and/or (4) an account holder of either the first PCB or the second PCB and an account holder at another PCB maintaining either (a) a subchain blockchain node linked to a subchain blockchain node of either or both the first PCB and the second PCB, or (b) a PCB node linked to a PCB node (e.g., in a consortium blockchain) of either or both the first PCB and the second PCB, or (c) an NPB communicatively coupled with either or both of the first PCB and the second PCB through a digital wallet, API, or an account.

Account holding customers of the first PCB and/or the second PCB may gain access to their account through, among other mechanisms, an instance of a digital wallet downloadable onto a computing device of the respective customers. Example digital wallets of two customers of the first PCB are represented symbolically as DW 330-A and DW 330-B. Example digital wallets of two customers of the second PCB are represented symbolically as DW 330-C and DW 330-D. Account holding customers of the first PCB and/or the second PCB may exchange CDBC reflected in their respective digital wallets for fiat-currency or other CBDC by presenting or syncing (e.g., via IOT, Bluetooth, Zigbee, Wi-Fi, mesh networking, etc.) digital wallet information (e.g., a QR code, a serial number, an ID, etc.) to a bank, ATM, or other exchange portal such as ATM 332.

Customers with digital wallets configured to transact with CBDC in the system may send or receive CBDC to digital wallets of other customers with whom they desire to transact, including by processing such transactions in whole or in part on a blockchain of the system 300-2. Where two customers of the same PCB desire to transact with one another, the subchain blockchain nodes of the PCB may process the transaction responsive to a communication from one or more digital wallets initiating the transaction. Where one customer of the first PCB and one customer of the second PCB desire to transact with one another, subchain blockchain nodes of one or more of the first PCB and the second PCB may process the transaction responsive to a communication from one or more digital wallets initiating the transaction. See also FIGS. 1, 4A-4C.

FIG. 5C illustrates an example aggregated system 300-3 in accordance with one or more embodiments of the present disclosure. System 300-3 illustrates a combination of system 300-1 and system 300-2, where the PCB node 310a and PCB node 310b represents the common elements in FIGS. 5A and 5B, and the elements connecting system 300-1 with system 300-2 in system 300-3.

Embodiments of system 300-3 may include a consortium blockchain, the consortium blockchain comprising one or more central bank nodes and one or more PCB nodes, the central bank nodes associated with at least one of a plurality of central banks exercising control over one of a plurality of jurisdictions, the PCB nodes associated with at least one of a plurality of PCBs maintaining situs in at least one of the plurality of jurisdictions over which a central bank of the plurality of central banks exercises control. In some embodiments PCB nodes may be associated with at least one of a plurality of PCBs maintaining situs outside at least one of the plurality of jurisdictions over which a central bank of the plurality of central banks exercises control.

Each respective central bank of the plurality of central banks may be configured to (1) mint, burn, and/or issue its own central bank digital currency (CBDC) as legal tender in the respective jurisdiction over which the respective central bank exercises control, and (2) transact with PCBs having situs in the same jurisdiction as the respective central bank using the CBDC issued by the respective central bank exercising control over the jurisdiction, and (3) transact with participating central banks and/or PCBs in other jurisdictions.

Each PCB of the plurality of PCBs that maintains situs in the same jurisdiction as a respective central bank is configured to (1) transact with the respective central bank using the CBDC issued by the respective central bank and/or using CBDC issued by another central bank from another jurisdiction that participates in the network, (2) transact with other PCBs having situs in the same jurisdiction as the given central bank using the CBDC issued by the central bank exercising control over the jurisdiction and/or using CBDC issued by another central bank from another jurisdiction that participates in the network, (3) transact with and on behalf of one or more customers of such PCB (including NPBs) using the CBDC issued by the central bank exercising control over the jurisdiction and/or using CBDC issued by another central bank from another jurisdiction that participates in the network, and (4) transact with PCBs in other jurisdictions directly or by utilizing a smart contract bridge imposed by the central bank that issued the CBDC being used in the transaction, which may include the CBDC of the PCB's domestic central bank and/or CBDC issued by another central bank from another jurisdiction that participates in the network.

Embodiments of system 300-3 may further include a plurality of subchain blockchains comprising one or more subchain blockchain nodes, each subchain blockchain associated with a PCB of the one or more PCBs. Each subchain blockchain may be operatively coupled with the one or more PCB nodes in the consortium block chain that are associated with the respective PCB of the one or more PCBs. Each PCB may maintain multiple subchains, one or more of which may be configured to process transactions involving a first type of CBDC but not other types of CBDC, while other one or more of which may be configured to process transactions involving a second type of CBDC but not other types of CBDC (e.g., not the first type of CBDC). Alternatively or additionally, in some embodiments a single subchain may be configured to process transactions involving multiple types of CBDC.

Embodiments of system 300-3 may further include a transaction management utility (not shown) configured to cause, directly or indirectly, the execution of one or more transactions on between two or more network participants. Network participants, as used herein, may include central bank(s), PCB(s), customer(s), other bank(s), and/or non bank payment services partners associated with one or more of: an account associated with a PCB node, a digital wallet connected to an account with a PCB associated with a PCB node, and an application (API) connected to a PCB associated with a PCB node. The transaction management utility may be accessible through (1) a computing device of a network participant having an established connection to the transaction management utility through an Application Programming Interface (API) operatively coupled with the transaction management utility, and/or (2) a digital wallet operatively coupled with the transaction management utility, or a member account operatively coupled with the transaction management utility.

In some embodiments of system 300-3, execution of the one or more transactions is performed in accordance with one or more execution procedures, the one or more execution procedures based on which network participants are involved in the one or more transactions.

In some embodiments of system 300-3, for a transaction between customers of one or more PCBs, the one or more execution procedures is selected further based on one or more of: (1) the location of the point-of-sale of the transaction, (2) the type of CBDC elected to support the transaction, and (3) the situs of one or more of the respective banking entities of the plurality of banking entities involved in the transaction.

For example, if (1) the point-of-sale is within a first jurisdiction, and (2) the CBDC elected to support the transaction was issued by the central bank exercising control over the first jurisdiction, and (3) each of the customers is associated with a digital wallet connected to an account with a single PCB maintaining situs in the first jurisdiction, then the one or more execution procedures causes execution of the transaction on the subchain blockchain associated with the single PCB.

In another example, if (1) the point-of-sale is within a first jurisdiction, and (2) the CBDC elected to support the transaction was issued by the central bank exercising control over the first jurisdiction, and (3) each of the customers is associated with a digital wallet connected to an account with one respective PCB, each respective PCB maintaining situs in the first jurisdiction, then the one or more execution procedures causes execution of the transaction on one or more of: the subchain blockchain hosted by a subchain blockchain node of one or both of the respective PCBs, and the consortium blockchain hosted by PCB nodes of both of the respective PCBs.

In some embodiments of system 100-3, for a transaction between PCBs, the one or more execution procedures is selected further based on one or more of: (1) the situs of the respective PCB entities involved in the transaction, and (2) the type of CBDC elected to support the transaction.

In another example, if (1) the situs of both PCBs is maintained in a first jurisdiction, and (2) the CBDC elected to support the transaction is the CBDC issued by the central bank exercising control over the first jurisdiction, then the one or more execution procedures causes execution of the transaction on the consortium blockchain hosted by PCB nodes of both PCBs.

In another example, if (1) the situs of a first PCB to the transaction is maintained in a first jurisdiction and the situs of a second PCB to the transaction is maintained in a second jurisdiction, and (2) the CBDC elected to support the transaction is the CBDC issued by the central bank exercising control over the first jurisdiction, then the one or more execution procedures causes execution of the transaction on the consortium blockchain involving (a) at least one PCB node of the first PCB that is configured to process the CBDC issued by the central bank exercising control over the first jurisdiction, (b) at least one PCB node of the second PCB that is configured to process the CBDC issued by the central bank exercising control over the first jurisdiction.

In embodiments of the present disclosure, PCBs in a given jurisdiction are configured with nodes that process account-based transactions within the given jurisdiction. PCBs in a given jurisdiction are also configured to process foreign transactions and transactions involving accounts within the given jurisdiction.

In some embodiments, PCBs within a given jurisdiction can only process transaction within such jurisdiction and with the central bank exercising control over such jurisdiction. The central bank exercising control over a particular jurisdiction may monitor global transactions involving PCBs within the particular jurisdiction (whether entirely within the jurisdiction or cross-border with a PCB in another jurisdiction).

In some embodiments of system 300-3, the consortium blockchain comprises a single blockchain hosted by the plurality of PCBs, the plurality of PCBs including at least one PCB maintaining situs within a first jurisdiction, and at least one PCB maintaining situs within a second jurisdiction, wherein the first jurisdiction is different than the second jurisdiction.

In some embodiments of system 300-3, the consortium blockchain comprises a single blockchain hosted by the plurality of PCBs, the plurality of PCBs including at least one PCB maintaining situs within a first jurisdiction, and at least one PCB maintaining situs within a second jurisdiction, wherein the first jurisdiction corresponds to a first geographical region and the second jurisdiction corresponds with a second geographical region, and further wherein the first geographical region and the second geographical region do not overlap. The first and second geographical regions may correspond to first and second countries, states, regions, and/or distinct territorial bodies.

In some embodiments of system 300-3, the consortium blockchain comprises a plurality of geo-blockchains, at least one geo-blockchain dedicated processing transactions for each type of CBDC issued by a central bank of the plurality of central banks, wherein each geo-blockchain is hosted only by PCBs maintaining situs within the jurisdiction over which the central bank that issued the type of CBDC exercises control.

In some embodiments of system 300-3, the transaction management utility is configured to permit a first NPB to initiate a transaction with and through a second PCB, where the second PCB hosts a geo-blockchain that the first NPB does not, through one or more of: a call to an Application Programming Interface (API) associated with the second PCB, a request from a digital wallet associated with the first PCB to the second PCB, and a request from an account held by the first PCB to second PCB.

In some embodiments of system 300-3, cash-based transactions (including transactions for small or fractional CBDC amounts) are processed by a subchain blockchain(s) of the first and/or second PCB.

In some embodiments of system 300-3, the transaction management utility is configured to permit a NPB that is not among the plurality of PCBs to initiate a transaction through a PCB that is among the plurality of PCBs, through one or more of: a call to an Application Programming Interface (API) associated with the PCB that is among the plurality of PCBs, and a request through a digital wallet establishing a connection between the PCB that is among the plurality of PCBs and the NPB that is not among the plurality of PCBs, and/or an account connected with the NPB that is not among the plurality of PCBs.

In some embodiments of system 300-3, the consortium blockchain comprises at least one blockchain node for each form of CBDC transactable within the system, wherein the at least one blockchain node for a given form of CBDC is hosted by one or more of: (1) PCBs maintaining situs within the jurisdiction over which the central bank that issues such form of CBDC exercises control, and (2) PCBs maintaining situs within a jurisdiction different from the jurisdiction over which the central bank that issues such form of CBDC exercises control.

In some embodiments of system 300-3, transaction management utility is configured to effect a transaction between PCB entities by executing one or more smart contracts. If each PCB involved in the transaction maintains situs within the same jurisdiction, a smart contract associated with the same jurisdiction is executed to effect the transaction. If each PCB involved in the transaction maintains situs in different jurisdictions, then two smart contracts may be executed to effect the transaction: the first smart contract between a first PCB and a first central bank associated with a first jurisdiction, the first jurisdiction being the jurisdiction within which the first PCB maintains situs. The second smart contract between the first central bank and a second PCB, the second PCB within a second jurisdiction, the second jurisdiction being the jurisdiction within which the second PCB maintains situs. In some embodiments, the second smart contract can be utilized to allow a PCB in the first jurisdiction to transact directly with the central bank of a second jurisdiction. In some embodiments the two aforementioned smart contracts may be consolidated or aggregated into a single smart contract such that a PCB in a first jurisdiction can transact directly with a PCB in a second jurisdiction.

In some embodiments of system 300-3, the transaction management utility is configured to effect a transaction between a central bank and PCB by executing one or more smart contracts. If the PCB and the central bank maintain situs in the same jurisdiction, a smart contract associated with the same jurisdiction is executed to effect the transaction. If the PCB and the central bank maintain situs in different jurisdictions, two smart contracts may be executed to effect the transaction. The first smart contract may be between the PCB and a second PCB, wherein the second PCB maintains situs in the same jurisdiction as the central bank. The second smart contract between the second PCB and the central bank. In some embodiments the two aforementioned smart contracts may be consolidated into a single smart contract such that a PCB in one jurisdiction can transact directly with the central bank of a second jurisdiction. Alternatively, if the PCB and the central bank maintain situs in different jurisdictions, two smart contracts may be executed to effect the transaction. The first smart contract may be between first PCB and a first central bank, wherein the first PCB maintains situs in the same jurisdiction as the first central bank. The second smart contract between the first central bank and a second central bank, wherein the second central bank maintains situs in a different jurisdiction than the first central bank. In some embodiments the two aforementioned smart contracts may be consolidated into a single smart contract such that a PCB in one jurisdiction can transact directly with the central bank of a second jurisdiction. Alternatively, in some configurations even if the PCB and the central bank maintain situs in different jurisdictions, a single smart contract may be executed between the PCB and the central bank to effect the transaction. The first smart contract may be between first PCB and a second central bank. In this manner, a PCB may directly transact with a central bank of another jurisdiction (i.e., not the PCB's home jurisdiction).

In some embodiments of system 300-3, each individual transaction executed within the system is encrypted to enhance privacy and limit visibility of each individual transaction to one or more of: (1) the PCB(s) involved in a given individual transaction, and (2) the central bank exercising control over the jurisdiction within which at least one of the PCB(s) involved in the given individual transaction maintains situs. In some embodiments, a smart contract may be imposed by a single jurisdiction's central bank. In some embodiments, a smart contract may be imposed between central banks and PCBs and/or between PCB pairs. In some embodiments, all transactions within a jurisdiction may be visible to the central bank exercising control over such jurisdiction. In some embodiments, a particular smart contract (or set of smart contracts) may be used based on different details of the transaction. For instance, there may be a particular smart contract (or set of smart contracts) imposed for a particular type of CBDC based transaction, a transaction processed on a particular chain, a transaction processed for a particular type of CBDC and processed by a particular consortium chain, a particular PCB-to-PCB transaction, a particular PCB-to-central bank transaction, a particular central bank-to-central bank transaction, a particular central bank-to-PCB transaction, or any particular arrangement of network participants involved in a transaction or one or more legs of a multi-step transaction, etc.

In some embodiments of system 300-3, each individual transaction executed within the system is encrypted to enhance privacy and limit visibility of each individual transaction to one or more of: (1) the PCB(s) involved in a given individual transaction, and (2) the central bank issuing the type of CBDC used in the given transaction.

In some embodiments of system 100-3, each individual transaction executed within the system is encrypted to enhance privacy and limit visibility of each individual transaction to one or more of: (1) the PCBs involved in a given individual transaction, (2) the central banks exercising control over the jurisdiction within which at least one of the PCBs involved in the given individual transaction maintains situs, and (3) the central banks issuing the form of CBDC used in the given transaction.

In some embodiments of system 100-3, the transaction management utility is configured to cause a subchain blockchain of a first PCB to execute, responsive to a relay request by the first PCB in response to a request from a customer (including an NPB) of the first PCB, a CBDC transaction on behalf of the customer (including an NPB) of the first PCB, wherein the customer (including an NPB) of the first PCB is an account holder of the first PCB.

In some embodiments of system 100-3, the transaction management utility is configured to cause a subchain blockchain of a first PCB to execute, responsive to a relay request by the first PCB in response to a request from a customer (including an NPB) of the first PCB, a CBDC transaction on behalf of the customer (including an NPB) of the first PCB, wherein the customer (including an NPB) is another bank that holds an account (or an API connection or digital wallet) with the first PCB, but which is not one of the plurality of PCBs that hosts a PCB node of the system.

In some embodiments of system 100-3, the transaction management utility is configured to cause the consortium blockchain associated with a first PCB to execute, responsive to a relay request by the first PCB in response to a request from a customer (including an NPB) of the first PCB, a CBDC transaction on behalf of the customer (including an NPB) of the first PCB, wherein the customer (including an NPB) is another bank that holds an account with the first PCB, but which is not one of the plurality of PCBs that hosts a PCB node of the system.

In some embodiments of system 300-3, the transaction management utility is configured to cause the consortium blockchain associated with a first PCB to execute, responsive to a relay request by the first PCB in response to a request from a customer (including an NPB) of the first PCB, a CBDC transaction on behalf of the customer (including an NPB) of the first PCB, wherein the customer (including an NPB) is another bank that holds a digital wallet connected with a PCB node of the first PCB, but which is not one of the plurality of PCBs that hosts a PCB node of the system.

In some embodiments of system 300-3, the transaction management utility is configured to cause the consortium blockchain associated with a first PCB to execute, responsive to a relay request by the first PCB in response to a request from a customer (including an NPB) of the first PCB, a CBDC transaction on behalf of the customer (including an NPB) of the first PCB, wherein the customer (including an NPB) is another bank with access to an application configured to make a call to an API provided by a PCB node of the first PCB, but which is not one of the plurality of PCBs that hosts a PCB node of the system.

In some embodiments of system 300-3, system 300-3 may further comprise a transaction monitoring utility. The transaction monitoring utility may be configured to permit each central bank of the plurality of central banks to monitor one or more of: (1) transactions involving the respective central bank itself, (2) transactions involving a transfer of CBDC that had been earlier issued by the respective central bank, and (3) transactions involving one or more PCBs of the plurality of PCBs that maintain situs in the same jurisdiction as the respective central bank, (4) transactions executed on the system where the point of sale is within the jurisdiction over which the central bank exercises control, (5) CBDC transactions among all PCBs in the jurisdiction governed by the central bank, and (6) all CBDC transactions within the jurisdiction governed by the central bank.

In some embodiments of system 300-3, a first PCB can initiate a CBDC transaction with CBDC of another jurisdiction through an account the first PCB holds with a second PCB using a traditional banking network operation.

In some embodiments of system 300-3, a PCB comprises separate servers operating as separate nodes of the PCB node, wherein each separate node is associated with a different type of CBDC that is transactable within the system.

In some embodiments of system 300-3, the separate servers are physically separate servers. In some embodiments of system 300-3, the separate servers are virtual servers that are logically separate servers.

In some embodiments of system 300-3, system 300-3 may further comprise a digital wallet application, instances of the digital wallet application being downloadable onto a computing device and associated with one or more of: a banking entity and a customer of banking entity (including an NPB). Each PCB may be associated with a single digital wallet, and the single digital wallet may be operatively coupled, via the transaction management utility, to one or more of: the consortium blockchain, one or more geo-blockchains, and one or more subchain blockchains.

In some embodiments of system 300-3, system 300-3 may further comprise a digital wallet application, instances of the digital wallet application being downloadable onto a computing device and associated with one or more of: a banking entity and a customer of banking entity (including an NPB). Each PCB may be associated with a plurality of digital wallets, and further wherein each digital wallet of the plurality of digital wallets may be operatively coupled, via the transaction management utility to only one of: the consortium blockchain, a single geo-blockchain, and a single subchain blockchain.

In some embodiments of system 300-3, a CBDC transaction between two PCBs maintaining the same or different situs is executable in real-time, near real-time, periodically. In some embodiments of system 300-3, a transaction between two PCBs maintaining the same or different situs is executable in a batch with a plurality of other transactions.

In some embodiments of system 300-3, a digital wallet of a customer of a PCB of the plurality of PCBs is configured to cause, responsive to input from the customer (and potentially with the imposition of a fee), an exchange of fiat currency for CBDC with the PCB. In some embodiments of system 300-3, a digital wallet of a customer of a PCB of the plurality of PCBs is configured to cause, responsive to input from the customer, and exchange of fiat currency for CBDC with any PCB of the plurality of PCBs. (and optionally, with the imposition of a fee). The CBDC that the fiat currency is exchanged for may be of the same type (e.g., USD-fiat currency exchanged for USD-CBDC) or be of a different type (e.g., USD-fiat currency exchanged for Euro-CBDC).

In some embodiments of system 300-3, a digital wallet of a customer of a PCB of the plurality of PCBs is configured to cause, responsive to input from the customer, and exchange of CBDC for fiat currency with the PCB (and optionally, with the imposition of a fee). In some embodiments of system 300-3, a digital wallet of a customer of a PCB of the plurality of PCBs is configured to cause, responsive to input from the customer, and exchange of CBDC for fiat currency with any PCB of the plurality of PCBs (and optionally, with the imposition of a fee). In some embodiments of system 300-3, a digital wallet of a customer of a PCB of the plurality of PCBs is configured to cause, responsive to input from the customer, and exchange of one type of CBDC for another type of CBDC with the PCB, or with any other PCB (and optionally, with the imposition of a fee). In some embodiments of system 300-3, a digital wallet of a customer of a PCB of the plurality of PCBs is configured to cause, responsive to input from the customer, and exchange of CBDC for another type of cryptocurrency (of any kind) with the PCB (and optionally, with the imposition of a fee).

In some embodiments of system 300-3, the consortium blockchain is configured to periodically settle transactions processed by the consortium blockchain of the system, processed by a subchain blockchain of the system (including cross-subchain transactions). In some embodiments of system 300-3, a subchain blockchain is configured to periodically settle transactions processed by the subchain blockchain of the system. In some embodiments of system 300-3, the consortium blockchain is configured to settle transactions processed by the consortium blockchain of the system in accordance with a priority, wherein the priority is based on one or more of: the network participants involved in the transaction and the type of CBDC used in the transaction. In some embodiments of system 300-3, settlement of transactions between accounts of PCBs of the plurality of PCBs are prioritized over settlement of transactions between digital wallets of customers, or vice-versa. In some embodiments of system 300-3, the consortium blockchain is configured to offload to an internal off-chain traditional banking system (also referred to as a "legacy" system) the settlement of transactions involving payment between accounts held at the same PCB.

Embodiments of the present disclosure further include all of the processes and sub-processes the aforementioned systems 300-1, 300-2, and 300-3 are disclosed to perform via one or more elements.

Although many of the examples provided herein discuss how a customer of a PCB may transact in and exchange different types of CBDCs and/or fiat currencies with one another through the PCB through whom they hold an account or digital wallet, it should be appreciated that with the present disclosure such users may complete such transactions and exchanges through any PCB participating in the relevant consortium chain.

Moreover, as the technologies of the present disclosure rest on blockchain solutions, it should be appreciated that any consensus protocols may be employed in connection with the technologies of the present disclosure. For instance, exemplary consensus protocols may include one or more of a proof-of-authority consensus operation, a proof-of-history consensus operation, and a proof-of-work consensus operation, a proof-of-two consensus operation and a proof-of-stake consensus operation (e.g., in connection with validation, verification, transaction execution, status, token tracking, etc.). Based on the disclosures, examples, and descriptions herein, a person of ordinary skill in the art will appreciate that, with the presently disclosed technologies, a user may be enabled to engage in extensive CBDC and fiat based transactions that involve fewer parties, fewer steps, less cost, more efficiency, and greater flexibility.

Finally, although the example networks illustrated in the Figures provided herewith illustrate an architecture having one consortium chain that is discussed as being dedicated to processing a single type of CBDC (e.g., Euro-CBDC), in alternative exemplary embodiments the technologies of the present disclosure may be configured to permit one consortium chain to process multiple types of CBDCs (e.g., Euro-CBDC and US-CBDC, etc.). Such embodiments may implement the foregoing through CBDC-specific smart contracts such that a transaction involving one type of CBDC is processed on the consortium chain by executing a first type of smart contract, and a transaction involving another type of CBDC is processed on the same consortium chain by executing a second type of smart contract. This multi-CBDC enabled consortium blockchain may also be built on top of other divisions defined by one or more smart contracts. For example, through the smart contract technologies of the present disclosure a geo-specific consortium blockchain may be configured to process transactions involving various multiple different types of CBDCs occurring within the geographic boundaries of the geo-specific consortium blockchain. By effecting different types of CBDC based transactions on the same consortium chain through the use of CBDC-specific smart contracts, such implementations may conserve computational hardware resources and provide a more sustainable architecture that consolidates the use of hardware resources through the use of intelligent software resources (which can often be updated, configured, reconfigured, and fixed much more expeditiously than hardware resources).

Figure 6:
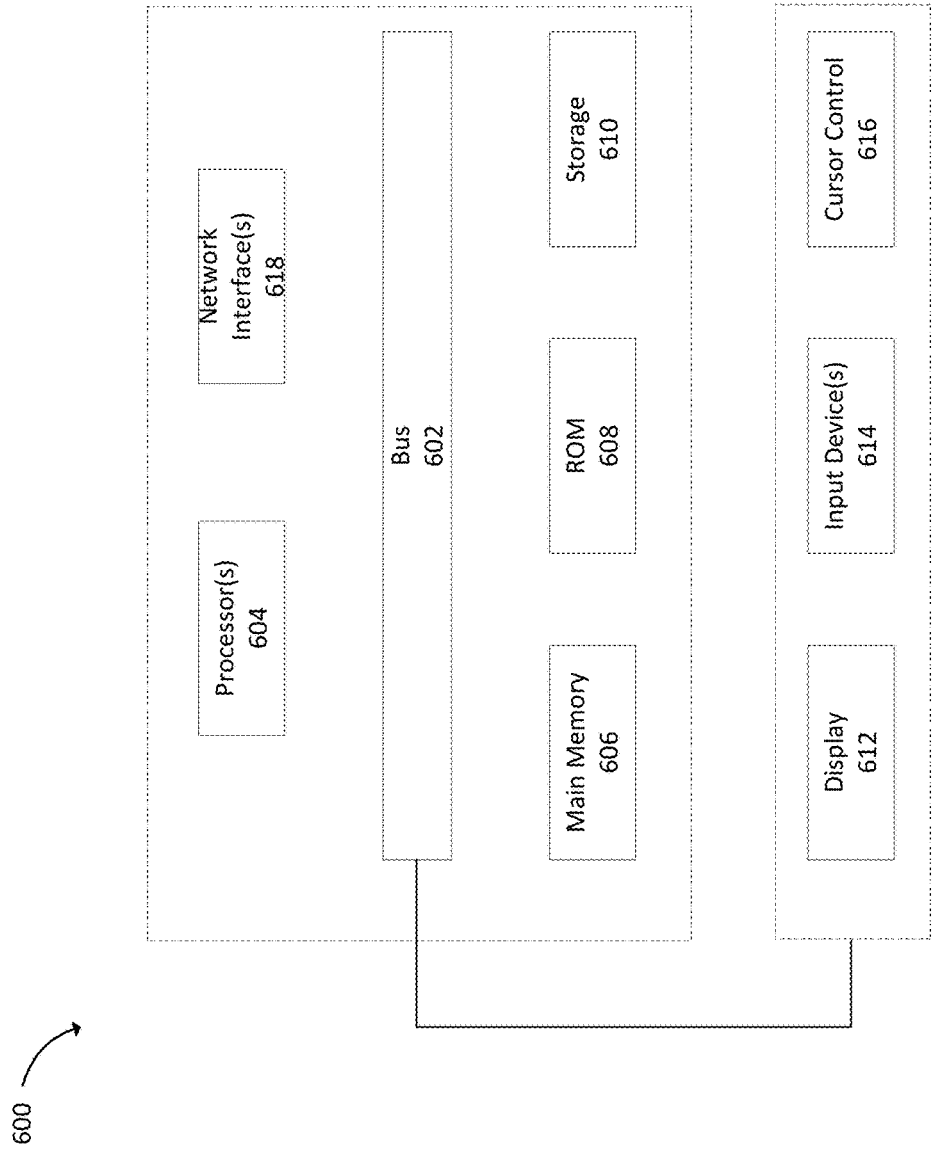
FIG. 6 is an example computing device that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 1006 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 1008 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. For enhanced security, in some embodiments storage at a node is embodied in ROM only.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor (e.g., via a touch enabled smartphone).

The computing system 600 may include a user interface component to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++, Golang. A software component may be compiled and linked into an executable program, installed in a dynamic link library, or may be written in an interpreted programming language such as, for example, GoLang, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 1006 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 1018. In the Internet example, a server might transmit a requested code for an application program through the Internet, the ISP, the local network and the communication interface 618.

The received code may be executed by processor 1004 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although various embodiments of the present disclosure are discussed herein in the context of blockchains, it should be understood that all such embodiments can be equally applied to distributed ledger technologies, centralized solution or any modifications or variations thereon. For example, to the extent an embodiment is described in the context of a blockchain network, it should be appreciated that the embodiment may more generally be applied in a distributed ledger network or a centralized solution.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The invention claimed is:

1. A system comprising:
a plurality of consortium blockchains, each consortium blockchain comprising a plurality of nodes communicatively coupled together and embodied in physical servers, and each consortium blockchain configured to process transactions involving a different one of a plurality of types of central bank digital currency (CBDC), each different type of CBDC minted by a different central bank, each central bank operating as a financial institution configured to mint a different type of CBDC, and each central bank maintaining one or more of a general digital wallet corresponding to a group of commercial banks, and plurality of private digital wallets each corresponding to a different commercial bank;
a plurality of servers hosted by the respective commercial banks, each of the commercial banks operating as a commercial financial institution maintaining a private digital wallet and each configured to host one or more nodes of one or more of the plurality of consortium blockchains;
wherein the commercial banks and the central banks are configured to transact with one another by transferring CBDC between their respective digital wallets via one or more of the consortium blockchains;
wherein one commercial bank of the group of commercial banks relays a transaction request from a non-participating partner bank ("NPB") for execution on one or more of the consortium blockchains; wherein an NPB is located in the same jurisdiction as the commercial bank, or located outside the jurisdiction as the commercial bank; and further wherein the NPB transmits such requests to the commercial bank using one or more of an account, a digital wallet, and an API;
a first subchain blockchain hosted entirely on one or more nodes maintained by a first commercial bank, wherein the first subchain blockchain is operatively coupled with (1) a second subchain blockchain hosted on a node maintained by a second commercial bank, (2) a first consortium blockchain, and (3) a second consortium blockchain;
wherein the first subchain blockchain and the second subchain blockchain together process transactions between digital wallets of network participants where a payer network participant is a customer of the commercial bank hosting the first subchain blockchain and the payee network participant is a customer of the commercial bank hosting the second subchain blockchain,
wherein when a first customer of a first participating commercial bank ("PCB") or first non-participating partner bank ("NPB") in a first jurisdiction without its own central bank digital currency ("CBDC") submits a request to transact with a second customer of a second NPB or second NPB in a second jurisdiction without its own CBDC, the system is configured to process the transaction over a first consortium blockchain leveraging a third jurisdiction's CBDC through one or more nodes or one or more accounts, digital wallets, and API connections to one or more PCB(s) hosting one or more nodes of the first consortium blockchain, the one or more PCB(s) and the third jurisdiction's CBDC serving as intermediaries between the first NPB and the second NPB;
wherein processing the transaction over the first consortium blockchain comprises: (1) the first PCB or NPB debiting a designated amount of fiat currency of the first jurisdiction from one or more of the first customer's account, (2) the first PCB or NPB converting the designated amount of fiat currency of the first jurisdiction into an amount of a first type of CBDC, the first type of CBDC corresponding to the type of CBDC issued in the commercial bank's jurisdiction; (3) the first PCB or NPB, or the first PCB in response to a communication from the first NPB, issuing a command to cause the first consortium blockchain to send the amount of the first type of CBDC to the second PCB or NPB in the second jurisdiction; (4) the second PCB or NPB converting the amount of the first type of CBDC into an amount of fiat currency of the second jurisdiction; and (5) the second PCB or NPB crediting the amount of fiat currency of the second jurisdiction into one or more of the second customer's account.

2. The system of claim 1, wherein multiple transactions between accounts held at the first commercial bank and the second commercial bank are processed on one of the consortium blockchains in batches, wherein processing in batches comprises pooling multiple transaction requests together and processing the pool of multiple transactions simultaneously.

3. The system of claim 1, wherein transactions occurring within one jurisdiction are executed pursuant to a smart contract that is different from other smart contracts used to execute transactions occurring within other jurisdictions, the smart contract used in one jurisdiction restricting the visibility of one or more of a central bank and a commercial bank in other jurisdictions from accessing details of the transaction occurring within the one jurisdiction.

4. The system of claim 3, wherein through execution of appropriate smart contracts, each central bank monitors transactions that occur (1) within the jurisdiction over which the respective central bank exercises control, (2) using the type of CBDC issued by the respective central bank, and (3) involving at least one account located within the jurisdiction over which the respective central bank exercises control.

5. The system of claim 1, wherein transactions occurring at a consortium blockchain node that is hosted by a commercial bank are executed in accordance with a smart contract restricting the ability of other commercial banks from accessing the details of the executed transactions.

6. The system of claim 1, wherein a cross-border transaction is executed pursuant to a first smart contract between the first commercial bank and a central bank, and a second smart contract between the central bank and the second commercial bank.

7. The system of claim 1, wherein the customer of the commercial bank exchanges one type of CBDC for another type of CBDC through a foreign exchange processing operation executed on the first consortium blockchain dedicated to processing the one type of CBDC as well as on the second consortium blockchain dedicated to processing the other type of CBDC.

8. A method, comprising:
providing a plurality of consortium blockchains, each consortium blockchain comprising a plurality of nodes communicatively coupled together and embodied in physical servers, and each consortium blockchain configured to process transactions involving of a plurality of types of central bank digital currency (CBDC), each different type of CBDC minted by a different central bank, each central bank operating as a financial institution configured to mint a different type of CBDC, and each central bank maintaining one or more of a general digital wallet corresponding to a group of commercial banks, and plurality of private digital wallets each corresponding to a different commercial bank;

maintaining, by each of a plurality of servers hosted by the respective commercial banks each operating as a commercial financial institution, a private digital wallet;

hosting, by each of a plurality of commercial banks, one or more nodes of one or more of the plurality of consortium blockchains;

wherein the commercial banks and the central banks are configured to transact with one another by transferring CBDC between their respective digital wallets via one or more of the consortium blockchains;

wherein one commercial bank of the group of commercial banks relays a transaction request from a non-participating partner bank ("NPB") for execution on one or more of the consortium blockchains; wherein an NPB is located in the same jurisdiction as the commercial bank, or located outside the jurisdiction as the commercial bank; and further wherein the NPB transmits such requests to the commercial bank using one or more of an account, a digital wallet, and an API;

providing a first subchain blockchain hosted entirely on one or more nodes maintained by a first commercial bank, wherein the first subchain blockchain is operatively coupled with (1) a second subchain blockchain hosted on a node maintained by a second commercial bank, (2) a first consortium blockchain, and (3) a second consortium blockchain;

wherein the first subchain blockchain and the second subchain blockchain together process transactions between digital wallets of network participants where a payer network participant is a customer of the commercial bank hosting the first subchain blockchain and the payee network participant is a customer of the commercial bank hosting the second subchain blockchain, wherein when a first customer of a first participating commercial bank ("PCB") or first non-participating partner bank ("NPB") in a first jurisdiction without its own central bank digital currency ("CBDC") submits a request to transact with a second customer of a second NPB or second NPB in a second jurisdiction without its own CBDC, the system is configured to process the transaction over a first consortium blockchain leveraging a third jurisdiction's CBDC through one or more nodes or one or more accounts, digital wallets, and API connections to one or more PCB(s) hosting one or more nodes of the first consortium blockchain, the one or more PCB(s) and the third jurisdiction's CBDC serving as intermediaries between the first NPB and the second NPB;

wherein processing the transaction over the first consortium blockchain comprises: (1) the first PCB or NPB debiting a designated amount of fiat currency of the first jurisdiction from one or more of the first customer's account, (2) the first PCB or NPB converting the designated amount of fiat currency of the first jurisdiction into an amount of a first type of CBDC, the first type of CBDC corresponding to the type of CBDC issued in the commercial bank's jurisdiction; (3) the first PCB or NPB, or the first PCB in response to a communication from the first NPB, issuing a command to cause the first consortium blockchain to send the amount of the first type of CBDC to the second PCB or NPB in the second jurisdiction; (4) the second PCB or NPB converting the amount of the first type of CBDC into an amount of fiat currency of the second jurisdiction; and (5) the second PCB or NPB crediting the amount of fiat currency of the second jurisdiction into one or more of the second customer's account.

9. The method of claim 8, wherein multiple transactions between accounts held at the first commercial bank and the second commercial bank are processed on one of the consortium blockchains in batches, wherein processing in batches comprises pooling multiple transaction requests together and processing the pool of multiple transactions simultaneously.

10. The method of claim 8, wherein transactions occurring within one jurisdiction are executed pursuant to a smart contract that is different from other smart contracts used to execute transactions occurring within other jurisdictions, the smart contract used in one jurisdiction restricting the visibility of one or more of a central bank and a commercial bank in other jurisdictions from accessing details of the transaction occurring within the one jurisdiction.

11. The method of claim 8, wherein through execution of appropriate smart contracts, each central bank monitors transactions that occur (1) within the jurisdiction over which the respective central bank exercises control, (2) using the type of CBDC issued by the respective central bank, and (3) involving at least one account located within the jurisdiction over which the respective central bank exercises control.

12. The method of claim 8, wherein transactions occurring at a consortium blockchain node that is hosted by a commercial bank are executed in accordance with a smart contract restricting the ability of other commercial banks from accessing the details of the executed transactions.

13. The method of claim 8, wherein a cross-border transaction is executed pursuant to a first smart contract between the first commercial bank and a central bank, and a second smart contract between the central bank and the second commercial bank.

14. The method of claim 8, wherein the customer of the commercial bank exchanges one type of CBDC for another type of CBDC through a foreign exchange processing operation executed on the first consortium blockchain dedicated to processing the one type of CBDC as well as on the second consortium blockchain dedicated to processing the other type of CBDC.

15. A nontransitory computer readable storage medium including instructions which, when executed by one or more processors of a system, cause the system to perform a method comprising:

providing a plurality of consortium blockchains, each consortium blockchain comprising a plurality of nodes communicatively coupled together and embodied in physical servers, and each consortium blockchain configured to process transactions involving a different one of a plurality of types of central bank digital currency (CBDC), each different type of CBDC minted by a different central bank, each central bank operating as a financial institution configured to mint a different type of CBDC, and each central bank maintaining one or more of a general digital wallet corresponding to a group of commercial banks, and plurality of private digital wallets each corresponding to a different commercial bank;

maintaining, by each of a plurality of servers hosted by the respective commercial banks, each commercial bank operating as a commercial financial institution, a private digital wallet;

hosting, by each of a plurality of commercial banks, one or more nodes of one or more of the plurality of consortium blockchains;

wherein the commercial banks and the central banks are configured to transact with one another by transferring CBDC between their respective digital wallets via one or more of the consortium blockchains;

wherein one commercial bank of the group of commercial banks a transaction request from a non-participating partner bank ("NPB") for execution on one or more of the consortium blockchains; wherein an NPB is located in the same jurisdiction as the commercial bank, or located outside the jurisdiction as the commercial bank; and further wherein the NPB transmits such requests to the commercial bank using one or more of an account, a digital wallet, and an API;

providing a first subchain blockchain hosted entirely on one or more nodes maintained by a first commercial bank, wherein the first subchain blockchain is operatively coupled with (1) a second subchain blockchain hosted on a node maintained by a second commercial bank, (2) a first consortium blockchain, and (3) a second consortium blockchain;

wherein the first subchain blockchain and the second subchain blockchain together process transactions between digital wallets of network participants where a payer network participant is a customer of the commercial bank hosting the first subchain blockchain and the payee network participant is a customer of the commercial bank hosting the second subchain blockchain, wherein when a first customer of a first participating commercial bank ("PCB") or first non-participating partner bank ("NPB") in a first jurisdiction without its own central bank digital currency ("CBDC") submits a request to transact with a second customer of a second NPB or second NPB in a second jurisdiction without its own CBDC, the system is configured to process the transaction over a first consortium blockchain leveraging a third jurisdiction's CBDC through one or more nodes or one or more accounts, digital wallets, and API connections to one or more PCB(s) hosting one or more nodes of the first consortium blockchain, the one or more PCB(s) and the third jurisdiction's CBDC serving as intermediaries between the first NPB and the second NPB;

wherein processing the transaction over the first consortium blockchain comprises: (1) the first PCB or NPB debiting a designated amount of fiat currency of the first jurisdiction from one or more of the first customer's account, (2) the first PCB or NPB converting the designated amount of fiat currency of the first jurisdiction into an amount of a first type of CBDC, the first type of CBDC corresponding to the type of CBDC issued in the commercial bank's jurisdiction; (3) the first PCB or NPB, or the first PCB in response to a communication from the first NPB, issuing a command to cause the first consortium blockchain to send the amount of the first type of CBDC to the second PCB or NPB in the second jurisdiction; (4) the second PCB or NPB converting the amount of the first type of CBDC into an amount of fiat currency of the second jurisdiction; and (5) the second PCB or NPB crediting the amount of fiat currency of the second jurisdiction into one or more of the second customer's account.

16. The nontransitory computer readable storage medium of claim 15, wherein multiple transactions between accounts held at the first commercial bank and the second commercial bank are processed on one of the consortium blockchains in batches, wherein processing in batches comprises pooling multiple transaction requests together and processing the pool of multiple transactions simultaneously.

17. The nontransitory computer readable storage medium of claim 15, wherein transactions occurring within one jurisdiction are executed pursuant to a smart contract that is different from other smart contracts used to execute transactions occurring within other jurisdictions, the smart contract used in one jurisdiction restricting the visibility of one or more a central bank and a commercial bank in other jurisdictions from accessing details of the transaction occurring within the one jurisdiction.

18. The nontransitory computer readable storage medium of claim 15, wherein through execution of appropriate smart contracts, each central bank monitors transactions that occur (1) within the jurisdiction over which the respective central bank exercises control, (2) using the type of CBDC issued by the respective central bank, and (3) involving at least one account located within the jurisdiction over which the respective central bank exercises control.

19. The nontransitory computer readable storage medium of claim 15, wherein transactions occurring at a consortium blockchain node that is hosted by a commercial bank are executed in accordance with a smart contract restricting the ability of other commercial banks from accessing the details of the executed transactions.

20. The nontransitory computer readable storage medium of claim 15, wherein a cross-border transaction is executed pursuant to a first smart contract between the first commercial bank and a central bank, and a second smart contract between the central bank and the second commercial bank.

21. The nontransitory computer readable storage medium of claim 15, wherein the customer of the commercial bank exchanges one type of CBDC for another type of CBDC through a foreign exchange processing operation executed on the first consortium blockchain dedicated to processing the one type of CBDC as well as on the second consortium blockchain dedicated to processing the other type of CBDC.

22. The system of claim 1, wherein the consortium blockchains, the first subchain blockchain, or the second subchain blockchain store and distribute biometrics information comprising any of fingerprint information, retinal information, facial feature information, and voice information.

* * * * *